United States Patent

Lu et al.

(10) Patent No.: US 9,903,943 B2
(45) Date of Patent: Feb. 27, 2018

(54) DISTANCE ESTIMATION METHOD AND DEVICE AS WELL AS NODE LOCALIZATION METHOD AND APPARATUS

(71) Applicants: Xiaomei Lu, Beijing (CN); Bin Da, Beijing (CN); Wei Wang, Beijing (CN); Linju Yang, Beijing (CN); Ke Liao, Beijing (CN)

(72) Inventors: Xiaomei Lu, Beijing (CN); Bin Da, Beijing (CN); Wei Wang, Beijing (CN); Linju Yang, Beijing (CN); Ke Liao, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 298 days.

(21) Appl. No.: 14/926,514

(22) Filed: Oct. 29, 2015

(65) Prior Publication Data

US 2016/0131750 A1 May 12, 2016

(30) Foreign Application Priority Data

Nov. 6, 2014 (CN) .......................... 2014 1 0636734

(51) Int. Cl.
*G01S 5/14* (2006.01)
*G01S 11/06* (2006.01)
*G01S 5/02* (2010.01)

(52) U.S. Cl.
CPC .............. *G01S 11/06* (2013.01); *G01S 5/0215* (2013.01); *G01S 5/0252* (2013.01); *G01S 5/14* (2013.01)

(58) Field of Classification Search
CPC .................................... G01S 5/14; G01S 11/02

(Continued)

(56) References Cited

U.S. PATENT DOCUMENTS 7,436,781 B2   10/2008 Niu et al.
2010/0304762 A1  12/2010 Hall
(Continued)

OTHER PUBLICATIONS

Shih-Hau Fang et al., "Indoor location system based on discriminant-adaptive neural network in ieee 802.11 environments," IEEE Transactions on Neural Networks, vol. 19, No. 11, pp. 1973-1978, 2008.

(Continued)

*Primary Examiner* — Dao Phan
(74) *Attorney, Agent, or Firm* — Cooper & Dunham LLP

(57) ABSTRACT

Disclosed is a method of estimating the distance between two nodes. The method includes obtaining an original real-time strength sequence, its elements being strengths of signals between the two nodes at respective time slots of a first time period; conducting multi-scale transform with respect to the original real-time strength sequence so as to acquire plural real-time strength component sequences which are results of the original real-time strength sequence projected onto plural scales; removing at least one burst noise element in each real-time strength component sequence so as to get plural updated real-time strength component sequences; estimating, based on the plural updated real-time strength component sequences and a multi-scale empirical mapping relationship, an empirical real-time distance, the multi-scale empirical mapping relationship being used for expressing correspondence relations between strength components and distance components; and determining, based on at least the empirical real-time distance, a real-time distance between the two nodes.

13 Claims, 8 Drawing Sheets

(58) Field of Classification Search
USPC ........ 342/451, 458, 463–465; 370/329, 338; 455/456.1, 456.5
See application file for complete search history.

(56) References Cited

U.S. PATENT DOCUMENTS

2013/0045750 A1    2/2013    Kim et al.
2015/0139124 A1    5/2015    Da et al.
2015/0245311 A1    8/2015    Wang et al.

OTHER PUBLICATIONS

Sujan Rajbhandari et al., "Wavelet-artificial neural network receiver for indoor optical wireless communications," Journal of Lightwave Technology, vol. 29, No. 17, 2651-2659, 2011.

"Artificial neural network", [online] Oct. 23, 2015, Wikipedia, Internet, <URL:https://en.wikipedia.org/wiki/Artificial_neural_network>.

DISTANCE ESTIMATION METHOD AND
DEVICE AS WELL AS NODE
LOCALIZATION METHOD AND APPARATUS

BACKGROUND OF THE INVENTION

1. Field of the Invention

The present invention relates to the field of wireless communications, and particularly relates to a distance estimation method and device as well as a node localization method and apparatus.

2. Description of the Related Art

Wireless communications is a kind of communications in which electromagnetic waves are utilized instead of cables, and has been widely used so far. According to the different frequencies of the electromagnetic waves, the communications protocols and the application scenarios of a wireless communications network are also different. For example, the wireless communications network may include the Global System for Mobile Communications (GSM), Radio Frequency Identifier (RFID), satellite communications, ultrasonic waves, Ultra Wide Band (UWB), or Bluetooth based network.

In such a wireless communications network, the distance estimation of two nodes plays an very important role in the communications process among respective nodes. For example, it is possible to estimate the distance between two nodes located in a specific environment by using the received signal strength between the two nodes. In theory, the received signal strength is inversely proportional to the distance between the two nodes. That is, the stronger the received signal strength is, the shorter the distance between the two nodes is; and vice versa.

However, there may exist spatial change (or called "environmental change") in a specific environment due to a movable or immovable obstacle therein. This kind of spatial change is also called "environmental noise" which may result in uncertainty in the distance estimation process between two nodes. For example, the environmental noise may include white noise and burst noise. Especially the burst noise may generate unpredictable influence on the distance estimation process, thereby resulting in a relatively large error in the distance estimation result. In general, the burst noise refers to one which suddenly occurs, whose amplitude is high, and whose time of duration is short. For example, a human being, who enters into and then immediately departs from a specific space in which plural nodes are located, may block the signal transmission being conducted between two nodes therein. This kind of blocking may result in the burst noise which may dramatically affect the received signal strength.

Conventionally the influence of the environmental noise is not taken into account. As such, when the burst noise occurs, the distance estimation process cannot get an accurate distance estimation result.

In order to deal with the burst noise, a solution has been proposed in which it is possible to utilize, before conducting the distance estimation process, a filter to directly remove the burst noise by conducting a filtering process. However, at present, there does not exist a method by which the position of the burst noise can be accurately determined. For this reason, when conducting the filtering process, it is easy to remove a valid signal, and/or it is impossible to completely remove the burst noise. As a result, there still exists a certain level of offset in the obtained distance estimation result.

SUMMARY OF THE INVENTION

One objective of the present invention is to provide a distance estimation method and device able to improve the precision of the relevant distance estimation result.

Another objective of the present invention is to provide a node localization method and apparatus able to effectively improve the localization accuracy.

According to a first aspect of the present invention, a distance estimation method is provided which is used for estimating a real-time distance between first and second nodes in a specific environment. The first node may receive a signal from the second node. The method includes:

an obtainment step of obtaining an original real-time strength sequence, wherein, original real-time strengths (i.e., elements) in the original real-time strength sequence are strengths of signals which are received by the first node from the second node at respective corresponding time slots in a first time period;

a transformation step of conducting multi-scale transform with respect to the original real-time strength sequence so as to acquire plural real-time strength component sequences, wherein, the plural real-time strength component sequences are results of the original real-time strength sequence projected onto plural scales, respectively;

a removal step of removing at least one burst noise element in each of the real-time strength component sequences so as to get plural updated real-time strength component sequences;

an estimation step of estimating, based on the plural updated real-time strength component sequences and a multi-scale empirical mapping relationship, an empirical real-time distance, wherein, the multi-scale empirical mapping relationship represents correspondence relations between strength components and distance components on each of the plural scales; and a determination step of determining, based on at least the empirical real-time distance, the real-time distance between the first and second nodes.

According to a second aspect of the present invention, a distance estimation device is provided which is used for estimating a real-time distance between first and second nodes in a specific environment. The first node may receive a signal from the second node. The device includes:

a real-time strength obtainment part (also called an "obtainment part") configured to obtain an original real-time strength sequence, wherein, original real-time strengths (i.e., elements) in the original real-time strength sequence are strengths of signals which are received by the first node from the second node at respective time slots in a first time period;

a multi-scale transform part (also called a "transformation part") configured to conduct multi-scale transform with respect to the original real-time strength sequence so as to acquire plural real-time strength component sequences, wherein, the plural real-time strength component sequences are results of the original real-time strength sequence projected onto plural scales, respectively;

a burst noise removal part (also called a "removal part") configured to remove at least one burst noise element in each of the real-time strength component sequences so as to get plural updated real-time strength component sequences;

an empirical real-time distance estimation part (also called an "estimation part") configured to estimate, based on the plural updated real-time strength component sequences and a multi-scale empirical mapping relationship, an empirical real-time distance, wherein, the multi-scale empirical mapping relationship represents correspondence relations between strength components and distance components on each of the plural scales; and a real-time distance determination part (also called a "determination part") configured to determine, based on at least the empirical real-time distance, the real-time distance between the first and second nodes.

According to a third aspect of the present invention, a node localization method is provided which is used for conducting localization with respect to a waiting-for-localization node whose position is unknown. The waiting-for-localization node may communicate with plural reference nodes whose positions are known. The method includes:

an estimation step of estimating, by using the above-described distance estimation method, plural real-time distances between the waiting-for-localization node and the plural reference nodes, respectively;

a selection step of selecting, from the plural reference nodes, a predetermined number of reference nodes; and a localization step of localizing the waiting-for-localization node based on the real-time distances between the waiting-for-localization node and the predetermined number of reference nodes as well as the positions of the predetermined number of reference nodes.

According to a fourth aspect of the present invention, a node localization apparatus is provided which is used for conducting localization with respect to a waiting-for-localization node whose position is unknown. The waiting-for-localization node may communicate with plural reference nodes whose positions are known. The apparatus includes:

the above-described distance estimation device configured to estimate plural real-time distances between the waiting-for-localization node and the plural reference nodes, respectively;

a reference node selection device (also called a "selection device") configured to select, from the plural reference nodes, a predetermined number of reference nodes; and a node localization device (also called a "localization device") configured to localize the waiting-for-localization node based on the real-time distances between the waiting-for-localization node and the predetermined number of reference nodes as well as the positions of the predetermined number of reference nodes.

Compared to the conventional techniques, by utilizing the distance estimation method and device according to the embodiments of the present invention, it is possible to, when the distance between two nodes is estimated on the basis of the received signal strength(s) between the two nodes, conduct multi-scale transform with respect to the received signal strength(s) so as to project the received signal strength(s) onto plural scales, so that it is possible to accurately localize and remove at least one component of burst noise on each of the plural scales. Furthermore it is also possible to efficiently take account of the time-varying characteristic of the received signal strength(s), so that when determining the distance between the two nodes, it is possible to conduct, by utilizing weight coefficients, mutual correction with respect to an ideal real-time distance having timeliness and an empirical real-time distance having historical orderliness so as to get a final real-time distance. As a result, by utilizing the distance estimation method and device, it is possible to improve the precision of the relevant distance estimation result.

In addition, by utilizing the node localization method and apparatus according to the embodiments of the present invention, it is possible to, when conducting localization with respect to a waiting-for-localization node on the basis of the real-time distances between the waiting-for-localization node and plural reference nodes as well as the positions of the plural reference nodes, select some proper reference nodes from the plural reference nodes according to a comprehensive criterion, so that it is possible to ensure that the estimated distance between the waiting-for-localization node and each of the selected proper reference nodes may receive the influence of burst noise as little as possible. As a result, it is possible to apply the node localization method and apparatus to different complicated environments, and by utilizing them, it is also possible to effectively improve the relevant localization accuracy.

DETAILED DESCRIPTION OF THE PREFERRED EMBODIMENTS

Figure 1:
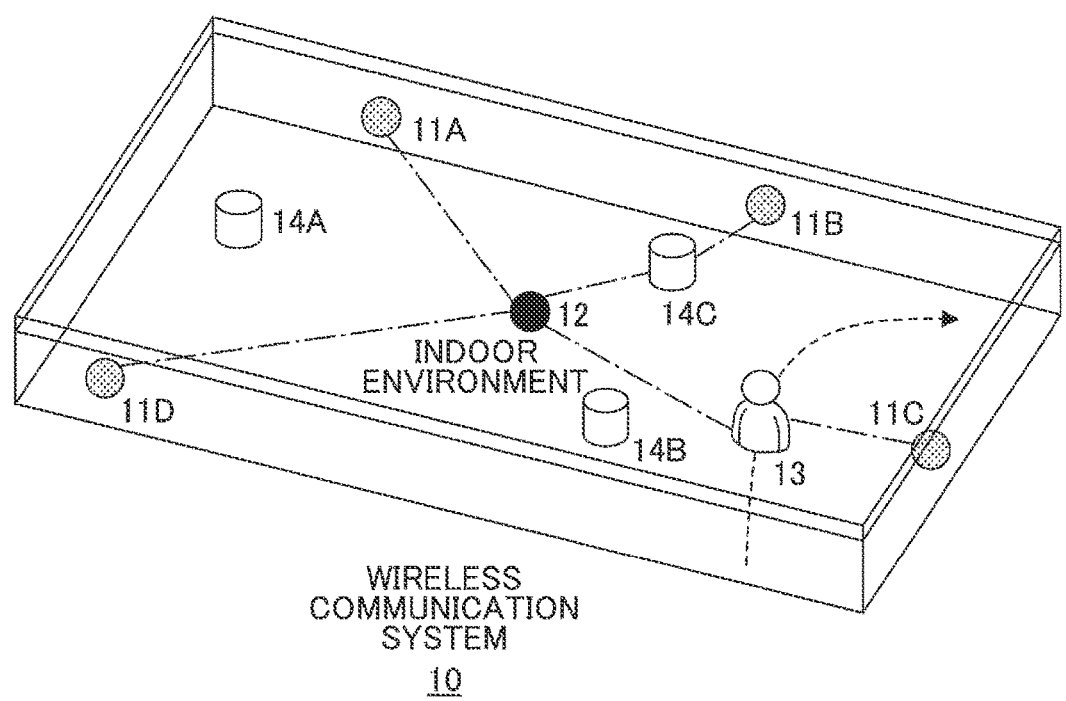
FIG. 1 illustrates an exemplary scenario in which the present invention may be applied.

In order to let those people skilled in the art better understand the present invention, hereinafter the present invention will be concretely described on the basis of the drawings and various embodiments according to the following order:

1. Outline of Thought of Invention
2. Application Scenario
3. Distance Estimation Method
4. Node Localization Method
5. Example of Node Localization Method
6. Distance Estimation Device
7. Node Localization Apparatus 1. Outline of Thought of Invention In the research for solving the technical problem existing in the conventional techniques, it has been found by the inventors that in most distance estimation processes, burst noise in received signal strengths between two nodes is directly removed by utilizing a filter. It is apparent that this kind of removal method is too simple and inefficient, and may remove a valid signal(s) and/or retain the burst noise.

Taking account of this, in a distance estimation method according to an embodiment of the present invention, the inventors proposes that it is possible to sufficiently consider the multi-scale characteristic of burst noise when localizing the burst noise, and to utilize, in the relevant distance estimation process, this kind of burst noise to assist a distance measurement process between two nodes.

Furthermore the inventors further proposes that it is also possible to, when conducting the distance estimation process on the basis of the received signal strengths, sufficiently consider the time-varying characteristic of the received signal strengths. In particular, regarding a distance estimation process on the basis of a current time slot, it is possible to divide the received signal strengths at plural time slots prior to the current time slot into two parts, i.e., a part of empirical received signal strengths and a part of real-time received signal strengths. As such, in the distance measurement process, it is possible not only to utilize the real-time received single strengths having timeliness to estimate the real-time distance between two nodes but also to utilize the empirical received signal strengths to assist the relevant real-time distance measurement process since the historical information in the empirical received signal strengths is very helpful to the distance measurement process.

Moreover, on the basis of the distance estimation process, the inventors further proposes a node localization method in which it is possible to select, on the basis of a comprehensive criterion, some reference nodes for localizing a waiting-for-localization node whose position is unknown. In this way, it is possible to solve the technical problem existing in the conventional techniques, that a localization process highly depends upon the accuracy of the relevant distance estimation process, and which results from selecting reference nodes according to only a simple criterion on the basis of the relevant received single strengths.

2. Application Scenario

In what follows, an exemplary scenario, in which the present invention may be applied, will be given by referring to FIG. 1.

Here it should be noted that a distance estimation method and device as well as a node localization method and apparatus according to the embodiments of the present invention may be applied in a wireless communications system which may be established in a specific environment.

For example, if the specific environment is an outdoor one, then the wireless communications system may be a GSM system, a satellite communications system, or a microwave communications system. In particular, if the satellite communications system is taken as an example, then it may be the Galileo system (Europe), the Global Navigation Satellite System (GLONASS; Russia), the Global Positioning System (GPS; U.S.), the BeiDou Navigation Satellite System (BDS; China), or the like. Since the technique related to this kind of wireless communications system is mature (i.e., well developed), by utilizing its relevant distance estimation process, it is possible to get a relatively large coverage and a relatively acceptable accuracy.

Again, for example, if the specific environment is an indoor one, then the wireless communications system may be a Radio Frequency Identifier (RFID) based one, a ZigBee based one, an ultrasonic wave based one, a super wideband based on, a Bluetooth based one, or the like. Here it is apparent that the above-mentioned distance estimation process related to the wireless communications system established based on the outdoor environment cannot solve the problem of signal shielding in the indoor environment, so it cannot be applied in this kind of wireless communications system established based on the indoor environment. Additionally since the technique related to this kind of wireless communications system is not well developed, and because the indoor environment is very complicated, when conducting a distance estimation process in this kind of wireless communications system established based on the indoor environment, generally there exists a problem that the relevant estimation accuracy is relatively low, and the relevant estimation time is relatively long.

However, the distance estimation method according to the embodiments of the present invention may be well applied in the wireless communications system established based on the indoor environment so as to cover the shortage described above, so that it is possible to accurately estimate the distance between two nodes in the indoor environment, thereby being able to carry out accurate localization with respect to a waiting-for-localization node therein. Aside from this, the distance estimation method according to the embodiments of the present invention may also be applied in the wireless communications system established based on the outdoor environment so as to improve the relevant estimation accuracy.

In addition, it should be noted that hereinafter although the wireless communications system established based on the indoor environment is taken as an example for illustration, the present invention is not limited to this. That is, the present invention may also be applied to the wireless communications system established based on the outdoor environment.

FIG. 1 illustrates an exemplary scenario in which the present invention may be applied.

As shown in FIG. 1, the exemplary scenario is an indoor environment. In the indoor environment, a wireless communications system 10 is established. It may include at least two nodes between which it is possible to conduct one-way or two-way communications, so that it is possible to estimate the distance between the two nodes in the indoor environment.

Particularly, in FIG. 1, the wireless communications system 10 includes five nodes 11A to 11D and 12. If the nodes 11A and 12 are taken as examples, then it may be seen from the drawing that communications may be conducted between the two nodes so as to be able to estimate the node distance between the two nodes in the indoor environment.

For example, in order to calculate the node distance between the nodes 11A and 12, it is possible to send a radio communications signal to the node 12 from the node 11A, or to the node 11A from the node 12. Furthermore a process of calculating the node distance on the basis of the received signal strength may be conducted at any one of the nodes 11A and 12. For example, if the node 11A sends a radio communications signal to the node 12, then the node 12 may directly calculate the node distance between the two nodes on the basis of the strength of the signal received from the node 11A. Alternatively if the node 12 sends a radio communications signal to the node 11A, then the node 11A may directly calculate the node distance between the two nodes on the basis of the strength of the signal received from the node 12. Moreover the node 11A or 12 may also send the received signal strength to a predetermined server (not shown in the drawing), so that the server may calculate the node distance between the two nodes.

Of course, in order to calculate the node distances between the node 12 and all the other nodes 11A to 11D, in the wireless communications system 10, the node 12 may communicate with each of the nodes 11A to 11D.

As described in the background of the invention, the node distance calculation process may receive the influence of environmental noise existing in the indoor environment. This kind of environmental noise mainly includes white noise and burst noise. The white noise refers to the uniformly distributed noise of power spectral density in the whole relevant frequency domain, and the burst noise refers to one which suddenly occurs, whose amplitude is relatively high, and whose time of duration is relatively short. In general, the white noise is caused by the long-term blocking of an immovable obstacle, which exists in the indoor environment, with respect to the communications path between two nodes therein. The burst noise is caused by the instant blocking of a movable obstacle, which exists in the indoor environment, with respect to the communications path between the two nodes. For example, a human being, who enters into and then immediately departs from the communications path between the two nodes may result in the burst noise.

For example, in FIG. 1, there exist a movable obstacle 13 and immovable obstacles 14A to 14C in the indoor environment. The movable obstacle 13 may be a human being. In a case where he/she walks along the moving locus which is represented by a dotted line with an arrowhead in FIG. 1, if he/she suddenly passes across the communications path between the nodes 11C and 12, then at the moment of blocking the communications path, burst noise may occur in the received signal strengths between the two nodes. In addition, as shown in FIG. 1, the immovable obstacles 14A and 14B are not located on the communications path of any two nodes, so they may not bring any influence on the wireless communications system 10. However, the immovable obstacle 14C is located on the communications path between the nodes 11B and 12, so it may affect the received signal strengths between the two nodes on a long-term basis so as to cause generating white noise.

In this case, in order to accurately measure the node distance between the nodes 11C and 12, it is necessary to localize and remove the burst noise in the received signal strengths between the two nodes. For this purpose, by utilizing the distance estimation method according to the embodiments the present invention, it is possible to conduct multi-scale transform with respect to the received signal strengths including the burst noise, between the nodes 11C and 12 so as to project the received signal strengths onto plural scales, so that it is possible to accurately localize and remove the component(s) of the burst noise projected onto each of the plural scales, thereby being able to accurately measure the distance of the two node.

Moreover it should be noted that in a wireless communications system, how to determine a node distance(s) therein is just a premise of some applications; that is, how to determine the position information of each node therein should be the foundation of the applications. For example, when a fire alarm is reported, it is necessary to know where the fire occurs. In other words, a monitoring activity without the exact position information is meaningless.

As such, in order to carry out a node localization process, it is possible to divide all the nodes in a wireless communications system into two classes, i.e., a class of reference nodes whose positions are known, and a class of waiting-for-localization nodes whose positions are unknown.

Particularly, in FIG. 1, it is possible to assume that the nodes 11A to 11D are reference nodes, and the node 12 is a waiting-for-localization node. Hereinafter, for the sake of convenience, if it is not necessary to distinguish among the reference nodes, then they may also be called a "reference node 11". As for the reference node 11, its identifier (ID) and position (e.g., the coordinates) are known. However, as for the waiting-for-localization node 12, only its ID is known, i.e., its position in unknown.

In the embodiments of the present invention, the reference node 11 may carry out, by utilizing Bluetooth, Infrared Ray (IR), Near Field Communications (NFC), RFID, etc., communications with the waiting-for-localization node 12. As such, in the distance estimation method according to the embodiments of the present invention, it is possible to acquire the real-time distance between the waiting-for-localization node 12 and the reference node 11, so that in the node localization method according to the embodiments of the present invention, it is possible to carry out, on the basis of the real-time distance and the position of the reference node 11, localization with respect to the waiting-for-localization node 12.

3. Distance Estimation Method

Figure 2:
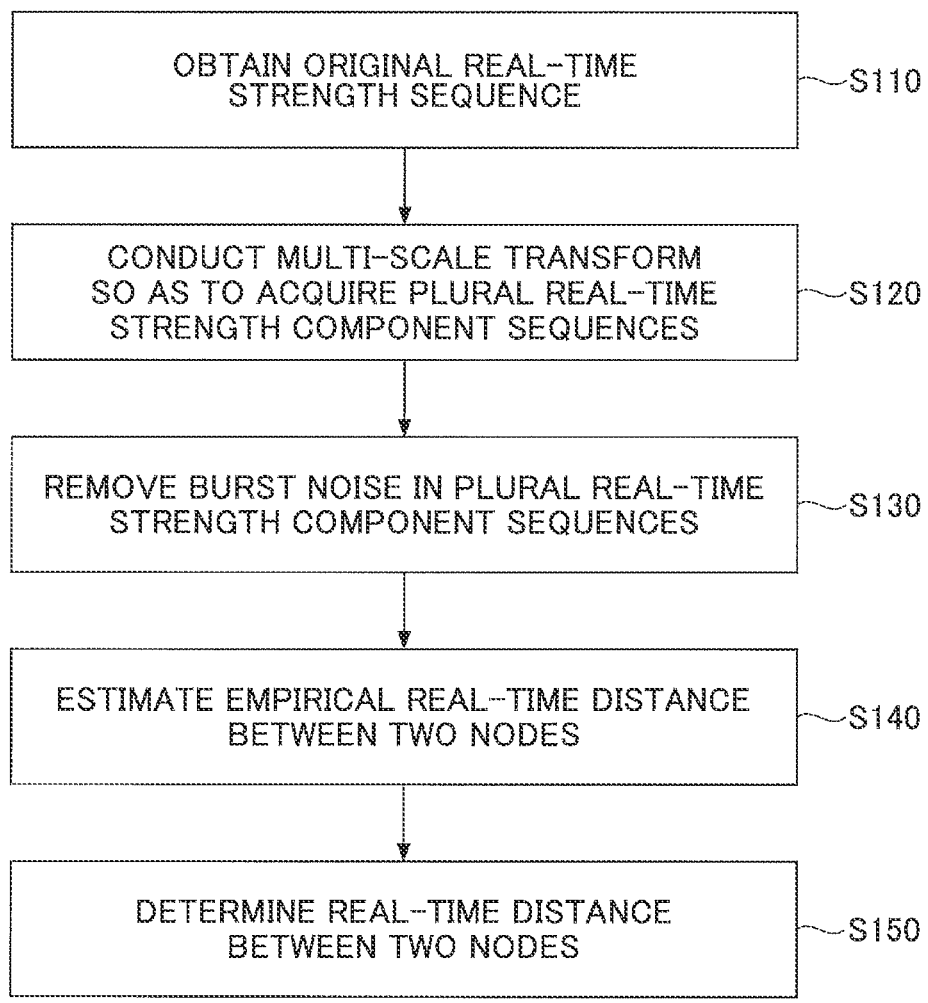
FIG. 2 is a flowchart of a distance estimation method according to an embodiment of the present invention.

In what follows, a distance estimation method according to an embodiment of the present invention will be illustrated by referring to FIG. 2.

The distance estimation method may be used to estimate the real-time distance between first and second nodes in a specific environment.

In this embodiment, the specific environment may be an outdoor environment or an indoor environment.

Here it should be noted that, as described above, regarding the outdoor environment, there has already existed some kind of distance measurement method whose result precision may meet the demand of everyday life, whereas regarding the indoor environment, the result precision of the relevant distance measurement method cannot meet the demand of users. Hence, in an example, the specific environment is the indoor environment.

For example, the indoor environment may be a special indoor environment in which a human being or an object may move occasionally so as to block the radio communications signal being transmitted between the two nodes, thereby causing generation of burst noise.

In addition, the distance estimation method may achieve, on the basis of the received signal strengths between the first and second nodes, the distance estimation process between the two nodes. For this purpose, in the specific environment, the first node may receive the signals sent from the second node. That is, in the distance estimation method, it is possible to obtain the strengths of the signals which are received by the first node from the second node.

FIG. 2 is a flowchart of the distance estimation method according to this embodiment.

As shown in FIG. 2, the distance estimation method may include STEPS S110 to S150.

In STEP S110 of FIG. 2, an original real-time strength sequence is obtained in which the original real-time strengths are the strengths of the signals (also called the "received signal strengths") which are received by the first node from the second node at the respective time slots of a first time period.

In STEP S120 of FIG. 2, multi-scale transform is conducted with respect to the original real-time strength sequence so as to acquire plural real-time strength component sequences which are the results of the original real-time strength sequence projected onto plural scales, respectively.

In STEP S130 of FIG. 2, at least one burst noise element in each of the plural real-time strength component sequences is removed so as to obtain plural updated real-time strength component sequences.

In STEP S140 of FIG. 2, on the basis of the plural real-time strength component sequences whose burst noise element(s) is removed (i.e., the plural updated real-time strength component sequences) and a multi-scale empirical mapping relationship, an empirical real-time distance between the two nodes is estimated. The multi-scale empirical mapping relationship is used for expressing the correspondence relations between strength components and distance components on each scale.

In STEP S150 of FIG. 2, on the basis of at least the empirical real-time distance between the two nodes, the real-time distance between the two nodes is determined.

In what follows, the respective steps will be concretely described.

In the distance estimation method according to this embodiment, in order to sufficiently take account of the time-varying characteristic of the received signal strengths, it is possible to divide, according to different time periods in which the received signal strengths are obtained, the received signal strengths into empirical received signal strengths and real-time received signal strengths, so that it is possible to utilize both the real-time received signal strengths having timeliness and the empirical received signal strengths having historical orderliness to conduct the relevant real-time distance measurement process so as to improve the precision of the relevant distance measurement result.

For this purpose, in an example, before STEP S110 of FIG. 2, it is possible to continuously obtain, by using specific sampling frequencies, the strengths of the signals which are received by the first node from the second node in one or more time periods, so as to serve as a received signal strength sequence. Here it should be noted that when implementing the distance estimation method according to this embodiment, as long as the received signal strength sequence can be obtained, it may be stored in the first node, the second node, or any other proper location.

For example, a received signal strength may be a received signal strength indicator (RSSI) obtained in a communications node, which may be sent by a wireless transmission layer, and may be used for determining the relevant link quality and whether it is necessary to increase the relevant broadcast strength.

Here it should be noted that although the RSSI is taken as an example for illustration, the present invention is not limited to this. For example, the received signal strength may also be a received signal power (Rx).

After obtaining the received signal strength sequence, it is possible to define the strength of the signal received by the first node from the second node at each time slot in a first time period near (e.g., immediately before) a current time slot as an original real-time strength, and the original real-time strengths may form an original real-time strength sequence. In addition, it is also possible to define the strength of the signal received by the first node from the second node at each time slot in a second time period prior to the first time period (i.e., far away from the current time slot) as an original empirical strength, and the original empirical strengths may form an original empirical strength sequence. Here it is apparent that depending on the sampling frequencies and the sampling time lengths of the received signal strengths, the original real-time strength sequence may include one or more original real-time strengths, and in the same way, the original empirical strength sequence may also include one or more original empirical strengths.

In this way, in STEP S110 of FIG. 2, it is possible to obtain the original real-time strength sequence according to the above-described division approach.

Next, in STEP S120 of FIG. 2, it is possible to conduct multi-scale transform with respect to the original real-time strength sequence. The multi-scale transform may also be called "multi-resolution analysis (MRA)" whose basic thought is expressing any function on different scale (or resolution) levels.

In an example, the multi-scale transform may be wavelet transformation. Compared to the Fourier transform, the wavelet transformation is the localized analysis of time (space) frequencies. By utilizing expansion and contraction, translation, etc., the wavelet transformation may gradually conduct multi-scale refinement with respect to signals (a function), so as to finally achieve time subdivision at high frequencies and frequency subdivision at low frequencies. In this way, it is possible to automatically adapt to the demand of time-frequency signal analysis so as to focus on any detail of the signals.

As such, by conducting the multi-scale transform, it is possible to project the original real-time strength sequence obtained in STEP S110 of FIG. 2 onto plural scales, respectively. In other words, by carrying out decomposition and reconstruction with respect to the original real-time strength sequence, it is possible to acquire plural real-time strength component sequences corresponding to the plural scales.

After that, in STEP S130 of FIG. 2, it is possible to remove at least one burst noise element in each of the plural real-time strength component sequences acquired in STEP S120 of FIG. 2 so as to get plural updated real-time strength component sequences.

In an example, it is possible to adopt the following step to remove at least one burst noise element in each of the plural real-time strength component sequences, namely, regarding each of the plural real-time strength component sequences, using a value obtained on the basis of elements not being the at least one burst noise element, in the corresponding real-time strength component sequence to replace the value of the at least one burst noise element.

For example, it is possible to calculate the average value of non-burst noise elements in the corresponding real-time strength component sequence, and then to use the average value to replace the value of the at least one burst noise element.

Again, for example, it is also possible to give a weight coefficient to each of the non-burst noise elements in the corresponding real-time strength component sequence, then to calculate the weighted average value of the non-burst noise elements, and then to use the weighted average value to replace the value of the at least one burst noise element. In this case, it is obvious that in a real-time strength component sequence, the closer to a current time slot a valid signal element (i.e., a non-burst noise element) is, the better its timeliness is, and the more accurately it can reflect the real-time distance between the first and second nodes. As such, it is possible to give a relatively high weight coefficient to a valid signal element near the current time slot, and to give a relatively low weight coefficient to a valid signal element far away from the current time slot.

In addition, in STEP S130 of FIG. 2, in order to accurately remove at least one burst noise element in each of the plural real-time strength component sequences without affecting the remaining elements (i.e., the non-burst noise elements), it is also possible to first localize the at least one burst noise element in the corresponding real-time strength component sequence.

In an example, it is possible to adopt the following step to localize at least one burst noise element in each of the plural real-time strength component sequences, namely, for each of the plural real-time strength component sequences, using the values of the respective elements in the corresponding real-time strength component sequence to determine the position of the at least one burst noise element therein.

For example, it is possible to calculate the average value of the respective elements in the corresponding real-time strength component sequence. After that, for each element in the corresponding real-time strength component sequence, it is possible to calculate the individual difference between the average value and the value of the corresponding element, and then to determine, when the individual difference is greater than or equal to a predetermined individual difference threshold, the corresponding element as a burst noise element.

In addition, in order to reduce the amount of calculation so as to increase the processing speed of the distance estimation method according to this embodiment, it is also possible to determine, before localizing at least one burst noise element in each of the plural real-time strength component sequences, whether the at least one burst noise element exists in the corresponding real-time strength component sequence. In this case, as long as it is determined that the at least one burst noise element exists in the corresponding real-time strength component sequence, the localization of the at least one burst noise element therein is conducted.

In an example, it is possible to adopt the following step to determine whether the at least one burst noise element exists in the corresponding real-time strength component sequence, namely, using the values of the respective elements in the corresponding real-time strength component sequence to carry out the determination.

For example, it is possible to calculate a total deviation of the element values of the corresponding real-time strength component sequence. If the total deviation is greater than or equal to a predetermine total deviation threshold, then it is possible to determine that the at least one burst noise element exists in the corresponding real-time strength component sequence. After that, it is possible to localize the at least one burst noise element in the corresponding real-time strength component sequence, as described above.

Next, in STEP S140 of FIG. 2, it is possible to estimate, on the basis of the plural real-time strength component sequences obtained after conducting noise removal in STEP S130 of FIG. 2 and a multi-scale empirical mapping relationship, an empirical real-time distance.

In an example, it is possible to adopt the following steps to estimate the empirical real-time distance on the basis of the plural real-time strength component sequences after burst noise removal (i.e., the plural updated plural real-time strength component sequences) and the multi-scale empirical mapping relationship, namely, a first step of estimating, on the basis of the plural updated real-time strength component sequences and the multi-scale empirical relationship, plural real-time distance component sequences which are the results of an original real-time distance sequence projected onto the plural scales, the original real-time distance in the original real-time distance sequence being the distance between the first and second nodes estimated at the corresponding time slot in the first time period; and a second step of generating, on the basis of the plural real-time distance component sequences, the empirical real-time distance.

For example, the second step may include calculating, regarding each of the plural real-time distance component sequences, the average value of the respective elements in the corresponding real-time distance component sequence to serve as a real-time distance component on the corresponding scale; and calculating the sum of the real-time distance components on the respective scales so as to generate the empirical real-time distance.

As described above, in the second step, it is obvious that it is also possible to calculate, by assigning weight coefficients, the weighted average value of the respective elements in each of the plural real-time distance component sequences.

In order to be able to estimate the empirical real-time distance on the basis of the plural updated real-time strength component sequences and the multi-scale empirical mapping relationship in STEP S140 of FIG. 2, it is possible to first generate, on the basis of an original empirical strength sequence and its corresponding original empirical distance sequence, the multi-scale empirical mapping relationship.

In an example, the multi-scale empirical mapping relationship may be a kind of self-learning model. In a process of conducting self-learning, it is possible to generate a self-learning model on the basis of special input and output data by carrying out training. Additionally, in a process of applying the self-learning model, it is possible to output different results on the basis of different input values according to a criterion obtained by carrying out the training.

For example, the multi-scale empirical mapping relationship may be an artificial neural network (ANN) which is also called a "neural network" or "connection model". For more information about that, it is possible to refer to https://en.wikipedia.org/wiki/Artificial_neural_network.

Here it should be noted that although the artificial neural network is taken as an example for illustration, the present invention is not limited to this. For example, the multi-scale empirical mapping relationship may also be a Markov model, a classifier, or the like.

In an example, it is possible to adopt the following steps to generate the multi-scale empirical mapping relationship on the basis of the original empirical strength sequence and its corresponding original empirical distances sequence, namely, obtaining the original empirical strength sequence and its corresponding original empirical distance sequence, each original empirical strength in the original empirical strength sequence being the strength of the signal received by the first node from the second node at the corresponding time slot in a second time period prior to the first time period, and each original empirical distance in the corresponding original empirical distance sequence being the distance between the first and second nodes obtained at the corresponding time slot in the second time period; respectively conducting multi-scale transform with respect to the original empirical strength sequence and its corresponding empirical distance sequence so as to obtain plural empirical strength component sequences and plural empirical distance component sequences on plural scales, the plural empirical strength component sequences being the projection results of the original empirical strength sequence on the plural scales, and the plural empirical distance component sequences being the projection results of the corresponding original empirical distance sequence on the plural scales; removing at least one burst noise element, if it exists, in each of the plural empirical strength component sequences so as to obtain plural updated empirical strength component sequences; and generating the multi-scale empirical mapping relationship on the basis of the plural updated empirical strength component sequences and the plural empirical distance component sequences.

In addition, as described above, an original empirical strength is the strength of the signal received by the first node from the second node at a time slot in the second time period prior to the first time period, which is far away from the current time period, and the original empirical distance corresponding to the original empirical strength is also obtained in the second time period. As such, the timeliness of the original empirical strength sequence and its corresponding original empirical distance sequence is not good, thereby being likely to lose their referential significance in a case where the circumstance in the specific environment changes. This may result in not being able to obtain an accurate empirical real-time distance in STEP S140 of FIG. 2 by utilizing the multi-scale empirical mapping relationship generated on the basis of the original empirical strength sequence and its corresponding original empirical distance sequence whose timelinesses are not good.

As a result, in order to solve this kind of problem, it is possible to determine, before estimating the empirical real-time distance on the basis of the plural updated real-time strength sequences and the multi-scale empirical mapping relationship, whether the multi-scale empirical mapping relationship meets the demand of timeliness. If it is determined that the multi-scale empirical mapping relationship does not meet the demand of timeliness, it is possible to generate a new multi-scale empirical mapping relationship having better timeliness.

In an example, it is possible to adopt the following steps to determine whether the multi-scale empirical mapping relationship meets the demand of timeliness, namely, determining, on the basis of the empirical real-time distance and an ideal real-time distance, the degree of environmental change in the specific environment, the ideal real-time distance being the node distance between the first and second nodes estimated on the basis of the original real-time strength sequence in an ideal circumstance; if the degree of environmental change is less than a predetermined threshold of environmental change, then determining that the multi-scale empirical mapping relationship meets the demand of timeliness, thereby determining the real-time distance between the first and second nodes on the basis of at least the empirical real-time distance; and if the degree of environmental change is greater than or equal to the predetermined threshold of environmental change, then determining that the multi-scale empirical mapping relationship does not meet the demand of timeliness, thereby obtaining a new original empirical strength sequence and its corresponding new original empirical distance sequence, and then generating a new multi-scale empirical mapping relationship.

For example, the new original empirical strength sequence and its corresponding new original empirical distance sequence may be ones obtained in a time period which is closer to the current time period than the second time period.

For this purpose, it is apparent that the distance estimation method according to this embodiment may further include estimating, on the basis of the original real-time strength sequence and an ideal mapping relationship, the ideal real-time distance. The ideal mapping relationship is used for expressing the corresponding relations between signal strengths and node distances in the ideal circumstance.

In an example, it is possible to adopt the following steps to estimate the ideal real-time distance on the basis of the original real-time strength sequence and the ideal mapping relationship, namely, estimating, on the basis of the original real-time strength sequence and the ideal mapping relationship, an ideal real-time distance sequence; and calculating the average value of the respective elements in the ideal real-time distance sequence to serve as the ideal real-time distance.

As described above, in the above process, it is obvious that it is also possible to calculate, by assigning weight coefficients, the weighted average value of the respective elements in an ideal real-time distance sequence.

For example, the ideal mapping relationship may be an ideal path loss model used for calculating an ideal real-time distance on the basis of the RSSI.

Eventually, in STEP S150 of FIG. 2, it is possible to determine the real-time distance between the first and second nodes on the basis of at least the empirical real-time distance obtained in STEP S140 of FIG. 2.

In an example, it is possible to directly let the empirical real-time distance be the real-time distance between the first and second nodes.

In another example, in order to more comprehensively utilize the real-time received signal strengths so as to obtain a more accurate real-time distance between the two nodes, it is possible to determine, on the basis of the empirical real-time distance and an ideal real-time distance, the real-time distance between the first and second nodes. The ideal real-time distance is the node distance between the first and second nodes estimated on the basis of the original real-time strength sequence in an ideal circumstance.

For example, it is possible to adopt the following steps to determine the real-time distance between the first and second nodes on the basis of the empirical real-time distance and the ideal real-time distance, namely, respectively giving weight coefficients to the empirical real-time distance and the ideal real-time distance; and calculating, on the basis of the weight coefficients, the weighted sum of the empirical real-time distance and the ideal real-time distance, so as to determine the real-time distance between the first and second nodes.

As a result, it can be seen from the above that by utilizing the distance estimation method according to this embodiment, when estimating the distance between the first and second nodes on the basis of the received signal strengths, it is possible to first carry out multi-scale transform with respect to the received signal strengths so as to project them onto plural scales, so that it is possible to accurately localize and remove the component(s) of burst noise projected onto each of the plural scales. In addition, by utilizing the distance estimation method, it is also possible to sufficiently take account of the time varying characteristic of the received signal strengths, so that in the relevant distance measurement process, by utilizing weight coefficients to conduct mutual correction with respect to the ideal real-time distance having timeliness and the empirical real-time distance having historical orderliness, it is possible to obtain a final real-time distance. Therefore, by utilizing the distance estimation method according to this embodiment, it is possible to improve the precision of the relevant distance measurement result.

4. Node Localization Method

After accurately obtaining the distance between two nodes according to the above-described distance estimation method, in an embodiment of the present invention, it is also possible to conduct, on the basis of the obtained distance of the two nodes, localization with respect to a waiting-for-localization node whose position is unknown in a specific environment.

At present, the well-used node localization techniques are mainly classified into two classes, namely, based on distance measurement and without distance measurement. In general, a localization algorithm without distance measurement is suitable to a homogeneous network because it needs a lot of sensors which may result in high cost, and compared to a localization algorithm based on distance measurement, its localization accuracy is relatively low, and its localization condition requirement is relatively high. In the conventional localization algorithms based on distance measurement, the relevant distance measurement may be based on proximity detection (PD), time of arrival (TOA), time difference of arrival (TDOA), angle of arrival (AOA), received signal strength (RSS), or the like. Among them, the localization accuracy of the node localization technique adopting the TOA, TDOA, or AOA based distance measurement method is relatively high, but it needs additional hardware, thereby resulting in high cost, a large volume, and inconvenience to installation and testing; in contract, most wireless devices have the ability to capture the RSS (received signal strength), so the node localization technique adopting the RSS based distance measurement method does not need additional hardware, thereby resulting in low cost, low power consumption, and a small volume.

In this embodiment, the node localization method may use the distance estimation method based on the received signal strength to obtain the real-time distance between a reference node and a waiting-for-localization node so as to localize the waiting-for-localization node, so it also has the above-mentioned advantages.

In addition, by utilizing the node localization method according to this embodiment, it is also possible to select, according to a more comprehensive criterion, some reference nodes suitable to assist in localizing the waiting-for-localization node, so as to be able to more accurately determine the position of the waiting-for-localization node.

In what follows, the node localization method according to this embodiment will be described in detail by referring to FIG. 3.

The node localization method may be used for carrying out localization with respect to a waiting-for-localization node whose position is unknown in a specific environment.

In an example, the specific environment may be an outdoor or indoor environment.

As described above, in order to solve the problem that the outdoor localization techniques such as the satellite localization and the like cannot be applied in the indoor environment, in an example, the node localization method according to this embodiment may be applied in the indoor environment.

However, the present invention is not limited to this. It is apparent that the node localization method according to this embodiment may also be applied in the outdoor environment.

In addition, in order to conduct localization with respect to a waiting-for-localization node, it is assumed that the waiting-for-localization node is able to communicate with plural reference nodes whose positions are known.

Figure 3:
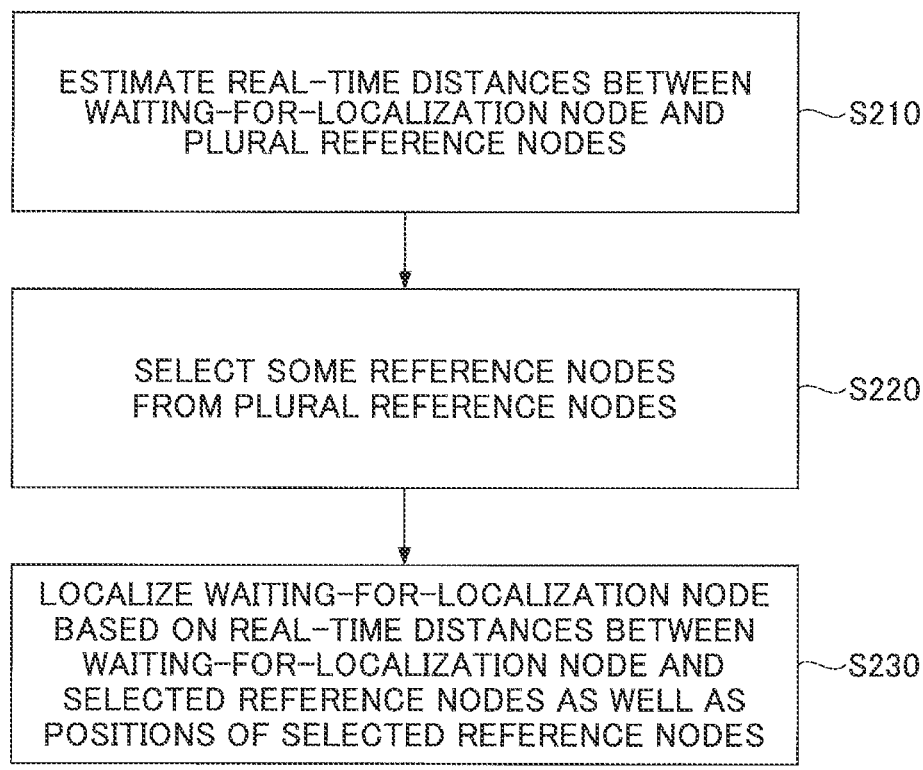
FIG. 3 is a flowchart of a node localization method according to an embodiment of the present invention.

FIG. 3 is a flowchart of the node localization method according to this embodiment.

As shown in FIG. 3, the node localization method may include STEPS S210 to S230.

In STEP S210 of FIG. 3, the real-time distances between the waiting-for-localization node and the plural reference nodes are estimated, respectively.

In STEP S220 of FIG. 3, a predetermined number of reference nodes are selected from the plural reference nodes.

In STEP S230 of FIG. 3, the waiting-for-localization node is localized on the basis of the real-time distances between the waiting-for-localization node and the selected reference nodes as well as the positions of the selected reference nodes.

In what follows, the respective steps will be concretely described.

In STEP S210 of FIG. 3, it is possible to use various distance estimation methods to estimate the real-time distances between the waiting-for-localization method and the plural reference nodes.

In an example, it is possible to utilize the distance estimation method according to the above embodiment to estimate the real-time distances between the waiting-for-localization node and the plural reference nodes, respectively.

Next, in STEP S220 of FIG. 3, it is possible to select a predetermined number of reference nodes from the plural reference nodes.

In theory, the higher the received signal strength from a reference node is, the closer to the waiting-for-localization node the reference node is, and the more accurate the localization result of the waiting-for-localization node is. As such, it is possible to choose the predetermined number of reference nodes according to the received signal strengths from the plural reference nodes.

For this reason, in an example, it is possible to adopt the following step to select the predetermined number of reference nodes from the plural reference nodes, namely, selecting, on the basis of only the received signal strengths, the predetermined number of reference nodes from the plural reference nodes.

On the other hand, actually, as described above, the received signal strengths may be influenced by burst noise, so if only the received signal strengths serves as a criterion for selecting the predetermined number of reference nodes, then the relevant node localization process may also be influenced by the burst noise. As such, when selecting the predetermined number of reference nodes, aside from considering the received signal strengths, it is also possible to consider the degree of environmental change in the specific environment on the time dimension, so as to select some reference nodes whose communications with the waiting-for-localization node may receive the influence of burst noise as little as possible.

For this purpose, in an example, it is possible to adopt the following steps to select the predetermined number of reference nodes from the plural reference nodes, namely, generating, on the basis of the original real-time strength sequence and the degree of environmental change in the specific environment, plural selection factors; and selecting the predetermined number of reference nodes on the basis of the values of the plural selection factors (e.g., in descending order of the values of the plural selection factors).

In an example, the predetermined number of reference nodes may be three or more reference nodes.

Finally, in STEP S230 of FIG. 3, it is possible to carry out, on the basis of the real-time distances between the waiting-for-localization node and the selected reference nodes as well as the positions of the selected reference nodes, localization with respect to the waiting-for-localization node.

In an example, it is possible to use a triangulation algorithm to conduct localization. The principle of the triangulation algorithm is utilizing three or more reference nodes at different positions to communicate with a waiting-for-localization node so as to determine, on the basis of the real-time distances between the three or more reference nodes and the waiting-for-localization node as well as the coordinates of the three or more reference nodes, the coordinates of the waiting-for-localization node according to the triangle geometry.

It can be seen from the above that by utilizing the node localization method according to this embodiment, it is possible to, when localizing the waiting-for-localization node on the basis of the real-time distances between the waiting-for-localization node and the plural reference nodes as well as the positions of the plural reference nodes, select some proper reference nodes according to a comprehensive criterion so as to ensure that the estimated distances between the waiting-for-localization node and the selected reference nodes may receive the influence of burst noise as little as possible. As a result, by utilizing the node localization method according to this embodiment, it is possible to adapt to different complicated environments, and to effectively improve the relevant localization accuracy.

Here it should be noted that although the distance estimation method according to the above embodiment is applied in a scenario of localizing a waiting-for-localization node, the present invention is not limited to this. That is, the distance estimation method may also be applied in any other proper scenario. For example, the distance estimation method may be applied in a scenario of detecting and tracking a target object on the basis of the relevant node distances so as to provide key information for automatically sensing the target object by a computer, and to provide bottom layer service to some upper layer applications (e.g., node activity recognition and scene understanding).

5. Example of Node Localization Method

In what follows, an example of the node localization method according to the above embodiment will be given by referring to FIGS. 4 to 8.

In this example, it is supposed that the node localization method is applied in a scenario where there are M (M≥3) reference nodes and one or more waiting-for-localization nodes. Here the positions and IDs of the reference nodes are known; the IDs of the one or more waiting-for-localization nodes are known, but the positions of the one or more waiting-for-localization nodes are unknown.

In particular, it is assumed that the scenario is the indoor environment shown in FIG. 1, where four (M=4) reference nodes 11A to 11D and one waiting-for-localization node 12 are provided.

Furthermore it is supposed that the respective nodes are Bluetooth low energy (BLE) nodes arranged in a building, which may communicate with each other according to a BLE protocol. That is, the waiting-for-localization node 12 may receive the communications signals sent from the reference node 11 at different time slots according to the BLE protocol.

Moreover, in order to conduct localization, the waiting-for-localization node 12 may extract, from the received communications signals, RSSI signals for indicating the corresponding received signal strengths, and may store the extracted RSSI signals in its own temporary memory.

Figure 4:
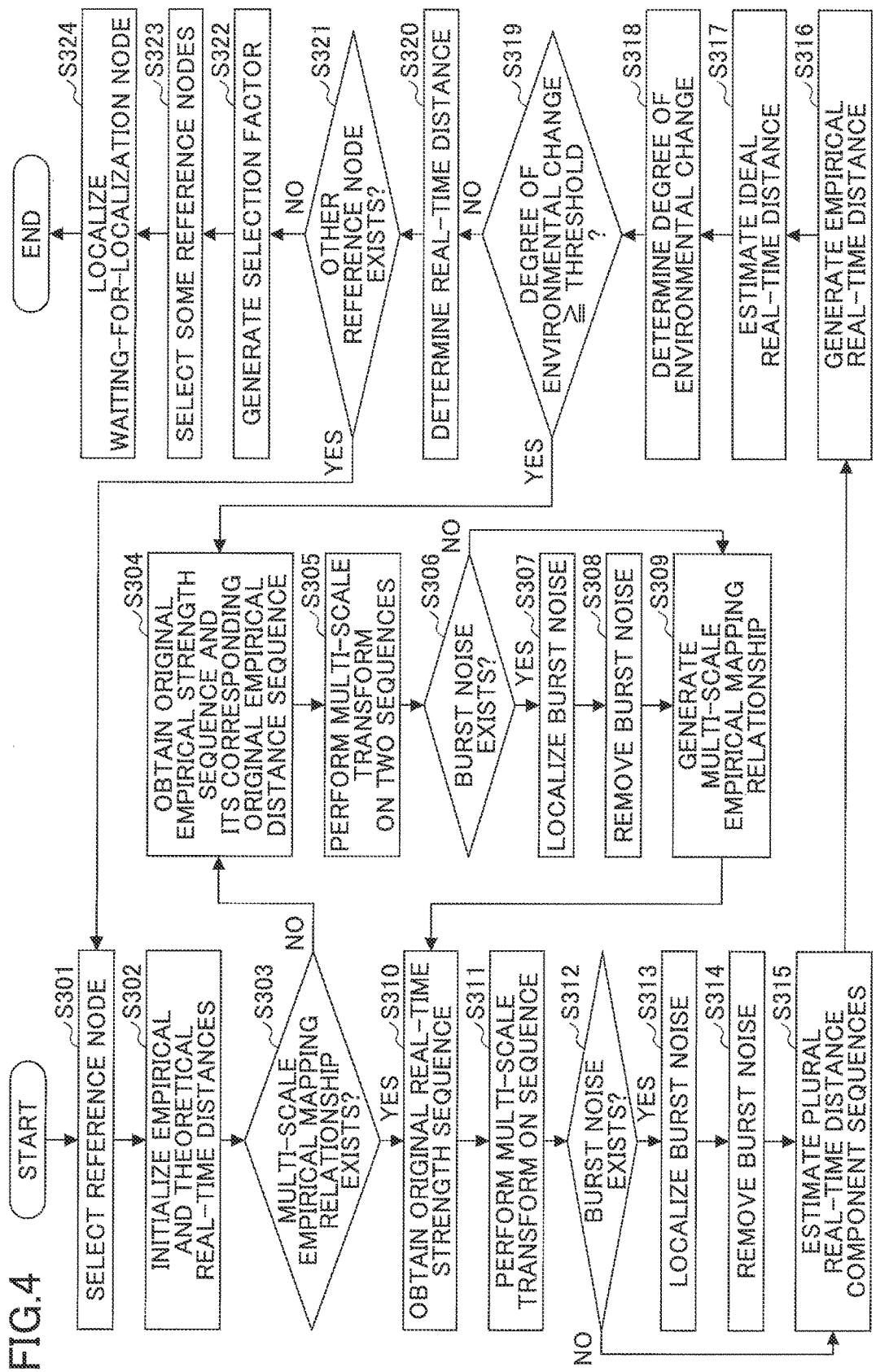
FIG. 4 is a detailed flowchart of the node localization method shown in FIG. 3.

In what follows, the detailed process of this example will be concretely illustrated by referring to FIG. 4.

FIG. 4 is a detailed flowchart of the node localization method shown in FIG. 3.

As shown in FIG. 4, in STEP S301, a reference node m is selected from M reference nodes.

In the indoor environment shown in FIG. 1, in order to localize the waiting-for-localization node 12, first it is necessary to estimate the distance between the waiting-for-localization node 12 and the reference node 11.

For this purpose, it is possible to select one from the four reference nodes 11A to 11D shown in FIG. 1 to serve as the reference node m (1≤m≤4). For example, first it is possible to select the reference node 11A as the reference node m, and in this case, m=1.

In STEP 302 of FIG. 4, initialization is conducted with respect to an empirical real-time distance and an ideal real-time distance related to the reference node m.

After selecting the reference node 11A, it is possible to conduct initialization with respect to the empirical and ideal real-time distances related to the reference node 11A. For example, in a localization apparatus for localizing the waiting-for-localization node 12, memory spaces are assigned to variables representing the two distances, respectively. Here it should be noted that the localization apparatus may be the waiting-for-localization node 12 itself, any one of the four reference nodes 11A to 11D, or any other proper electronic apparatus.

For the sake of convenience, hereinafter the waiting-for-localization node 12 serves as the localization apparatus.

In STEP 303 of FIG. 4, it is determined whether a multi-scale empirical mapping relationship related to the reference node m exists.

Particularly it is possible to determine whether there is a multi-scale empirical mapping relationship related to the reference node 11A, which may be obtained by conducting training. In the former case, STEP S310 of FIG. 4 will be conducted, and in the latter case, STEP S304 of FIG. 4 will be conducted.

For example, the multi-scale empirical mapping relationship may be generated by employing a three layered back propagation (BP) neural network model.

Figure 5:
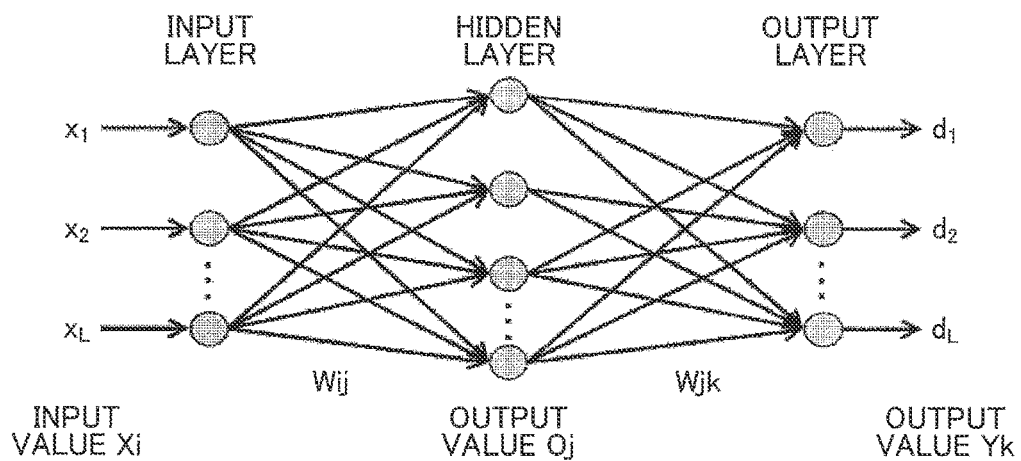
FIG. 5 illustrates the principle of a three layered back propagation neural network model.

FIG. 5 illustrates the principle of the three layered back propagation neural network model.

As shown in FIG. 5, the principle of the three layered back propagation neural network model is as follows. The input values $X_i$ act on the output nodes (located in the output layer) from the input nodes (located in the input layer) via the intermediate nodes (located in the hidden layer), so as to generate the output values $Y_k$ according to non-linear transformation. Each sample for conducting training includes an input value X and a desired output value T. Regarding the error (e.g., a difference of two squares) between a network output value Y and the desired output value T, the connection strengths $W_{ij}$ between the input and hidden layers, the connection strengths $W_{jk}$ between the hidden and output layers, and the relevant thresholds are adjusted so as to let the error decrease along the gradient direction as fast as possible until the error becomes minimum. After that, network parameters (e.g., a weight coefficient(s) and a threshold(s)) corresponding to the minimum error are determined, so that a three layered back propagation neural network model is obtained. At this time, by utilizing this kind of three layered back propagation neural network model, regarding the input data of a similar sample, it is possible to output the relevant information which is on the basis of non-linear transformation and whose error is minimum. Here it should be noted that the principle of the three layered back propagation neural network model is well known, so its detailed information is omitted here.

In the follow-on steps of FIG. 4, for example, it is possible to use a three layered back propagation neural network model in which the ratio of the input layer, the hidden layer, and the output layer is 1:26:1, and to adopt the Traincgf algorithm to conduct training so as to generate the three layered back propagation neural network model.

It is obvious that up to here, the three layered back propagation neural network model has not been generated yet, so at this time, STEP S304 of FIG. 4 is conducted for generating the three layered back propagation neural network model.

In STEP S304 of FIG. 4, an original empirical strength sequence and its corresponding original empirical distance sequence are obtained.

In order to generate the three layered back propagation neural network model by conducting training, the waiting-for-localization node 12 may read a predetermined number of RSSI signals stored in its own temporary memory. The predetermined number may depend on the processing ability of the waiting-for-localization node 12 and the environmental change frequency of the indoor environment. That is, if a large number of RSSI signals are chosen, then a lot of resources of the waiting-for-localization node 12 may be consumed, thereby causing some RSSI signals to lose their referential significance.

After that, the waiting-for-localization node 12 may divide, on the basis of a current time slot, the predetermined number of RSSI signals into two parts, namely, an empirical strength sequence $X_m$ (also called an "empirical RSSI signal sequence") and a real-time strength sequence $Y_m$ (also called a "real-time RSSI signal sequence") according to the different time slots at which the predetermined number of RSSI signals were obtained.

Figure 6:
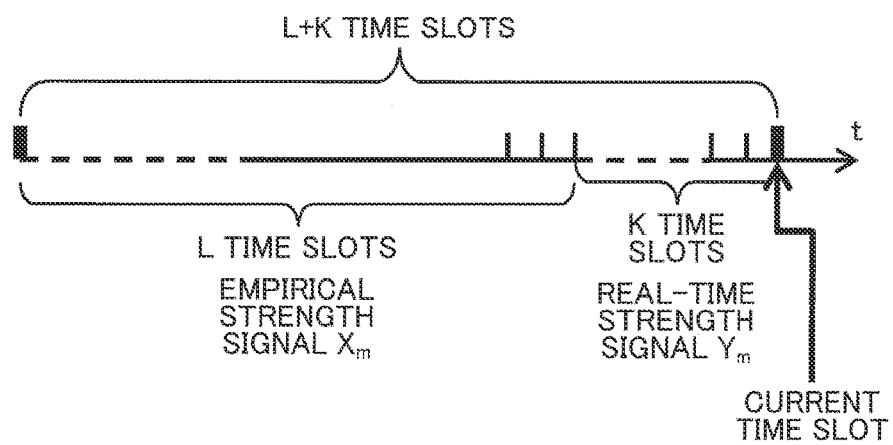
FIG. 6 illustrates how to distinguish between empirical and real-time strength signals.

FIG. 6 illustrates of how to distinguish between empirical and real-time strength signals.

As shown in FIG. 6, it is supposed that the waiting-for-localization node 12 has obtained the RSSI signals received at L+K time slots in total. In this case, according to a predetermined division rule, it is possible to determine the RSSI signals of the K time slots immediately before the current time slot as real-time strength signals, and to determine the RSSI signals of the L time slots immediately before the K time slots as empirical strength signals. For example, L+K may be equal to 500; here, L may be equal to 200, and K may be equal to 400.

Particularly, in this step, the waiting-for-localization node 12 may obtain an empirical RSSI signal sequence $X_m$=[x1, x2, . . . , xl, . . . , xL], and may also obtain an empirical distance sequence $DI_m$=[di1, di2, . . . , dil, . . . , diL] corresponding to the empirical RSSI signal sequence to serve as the original empirical strength sequence and its corresponding original empirical distance sequence. Here L refers to the length of each of the two sequences, and is related to the relevant sampling frequencies. For example, the initial value of each element in the empirical distance sequence $DI_m$ may be obtained by conducting artificial fixed-point measurement, according to empirical values, or by utilizing any other proper approach.

In STEP S305 of FIG. 4, multi-scale transform is conducted with respect to the original empirical strength sequence and its corresponding original empirical distance sequence so as to obtain plural empirical strength component sequences and plural empirical distance component sequences.

Particularly, after the empirical RSSI signal sequence $X_m$ and its corresponding empirical distance sequence $DI_m$ are obtained, it possible to carry out multi-scale transform with respect to them, respectively.

For example, the multi-scale transform may be achieved by conducting N layered wavelet transformation (or called "N layered wavelet analysis").

Figure 7:
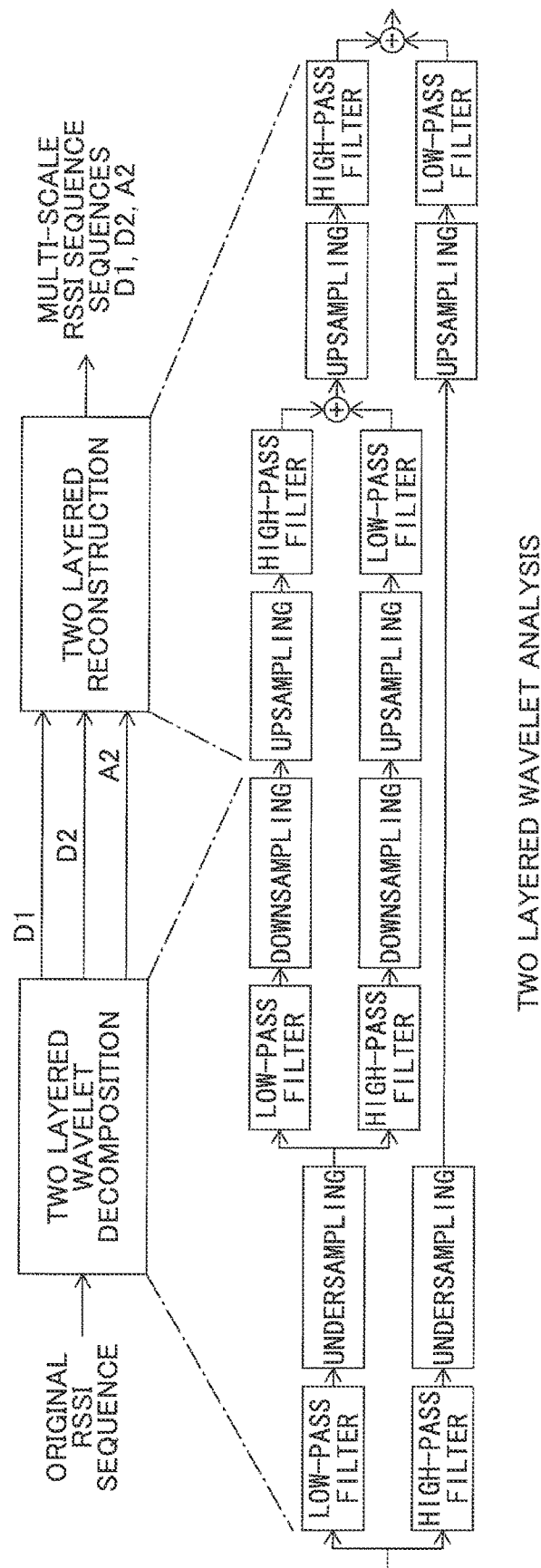
FIG. 7 illustrates the principle of two layered wavelet analysis.

FIG. 7 illustrates the principle of two layered wavelet analysis.

The two layered wavelet transformation utilizes vibrational waves, which have limited lengths or may rapidly decay, to express signals. These kinds of vibrational waves are called "mother wavelets". For example, it is possible to use Haar wavelets to serve as the mother wavelets. Additionally, by utilizing expansion and contraction, translation, etc., the two layered wavelet transformation may gradually conduct multi-scale refinement with respect to signals (a function) so as to finally achieve time subdivision at high frequencies and frequency subdivision at low frequencies, so that the obtained two detailed part sequences D1 and D2 (due to the two layered wavelet analysis) and one approximation part sequence A2 may match the original input signals. Here it should be noted that the principle of wavelet transformation is well known, so its detailed information is omitted here.

For example, it is possible to adopt the Mallat algorithm to generate a N layered wavelet analysis model. The Mallat algorithm utilizes a group of high-pass filters and a group of low-pass filters to decompose and reconstruct input signals, as shown in FIG. 7.

After generating the N (e.g., N=3 in this example) layered wavelet analysis model by adopting the Mallat algorithm, it is possible to use the N layered wavelet analysis related techniques to carry out decomposition and reconstruction with respect to the empirical RSSI signal sequence $X_m$ and its corresponding empirical distance sequence $DI_m$ so as to obtain a multi-scale signal sequence group which includes N detailed part sequence groups ({D1_i, D1_o}, {D2_i, D2_o}, . . . , {DN_i, DN_o}) and one approximation part sequence group (AN_i, AN_o). Here, {D1_i, D2_i, . . . , DN_i, AN_i} is the reconstructed result of $X_m$, and {D1_o, D2_o, . . . , DN_o, AN_o} is the reconstructed result of $DI_m$.

In STEP S306 of FIG. 4, regarding each of the empirical strength component sequences, it is determined whether burst noise exists in the corresponding empirical strength component sequence.

In this step, if it is determined that the burst noise exists in the corresponding empirical strength component sequence, then STEP S307 of FIG. 4 will be conducted; otherwise, STEP S309 of FIG. 4 will be conducted.

In general, compared to a valid signal, in an indoor environment, the frequency of environmental noise is relatively high, and the value of the environmental noise is relatively small. The wavelet analysis may decompose original signals into multi-scale signals on different frequency segments, so it is possible to carry out burst noise localization with respect to the detailed parts in the reconstructed results so as to remove the burst noise.

For example, regarding each sequence in the detailed part set {D1_i, D2_i, . . . , DN_i}, it is possible to calculate the standard deviation and the desired value of the corresponding sequence.

Here the first sequence D1_i in the detailed part set {D1_i, D2_i, . . . , DN_i} is taken as an instance, which is a detailed part sequence obtained by conducting one layer wavelet transformation with respect to the empirical RSSI signal sequence $X_m$. It is obvious that the empirical RSSI signal sequence $X_m$ includes L elements in total, so the first sequence D1_i may also include L elements. For example, it is possible to calculate the standard deviation σ and the desired value μ of the first sequence D1_i according to the following equation (1).

$$\sigma = \sqrt{\frac{1}{L}\sum_{l=1}^{L}(d1l-\mu)^2} \tag{1}$$

$$\mu = \frac{1}{L}\sum_{l=1}^{L} d1l$$

Here, d1*l* stands for an l-th element in the first sequence D1_*i*.

If the standard deviation obtained according to the equation (1) is greater than or equal to a predetermined threshold, i.e., $\sigma \geq \sigma_{th}$, then it is possible to determine that there exists burst noise in the first sequence D1_*i*.

In STEP S307 of FIG. 4, at least one burst noise element in each of the plural empirical strength component sequences is localized.

After determining that the burst noise exists in the first sequence D1_*i*, it is possible to localize a burst noise element set according to the following equation (2).

$$\Omega = \{(d1l, P) \| d1l - \mu | \mu_{th}, P = argd1l(l)\} \quad (2)$$

Here, P refers to the position of a burst noise element, and $\mu_{th}$ refers to a predetermined threshold which may be decided on the basis of an empirical value.

In STEP S308 of FIG. 4, the at least one burst noise element in each of the plural empirical strength component sequences is removed.

After determining the position of the at least one burst noise element (also called a "burst point") in the first sequence D1_*i*, it is possible to remove that from the first sequence D1_*i*.

For example, it is possible to calculate the average value of the non-burst points in the first sequence D1_*i*, and then to replace the value of the at least one burst point by using the average value so as to obtain an updated first sequence D1_*i*.

Here it should be noted that up to here, the noise removal process with respect to the first sequence D1_*i* in the detailed part set {D1_*i*, D2_*i*, ..., DN_i} has been described, but it is apparent that in the same way, it is also possible to conduct noise removal with respect to the other sequence in the detailed part set {D1_*i*, D2_*i*, ..., DN_i} so as to remove all the burst points in the detailed part set {D1_*i*, D2_*i*, ..., DN_i}. In addition, actually, after conducting noise removal with respect to the detailed part set {D1_*i*, D2_*i*, ..., DN_i}, it is also possible to conduct noise removal with respect to the approximation part set {AN_i}.

In STEP S309 of FIG. 4, a multi-scale empirical mapping relationship related to the reference node m is generated on the basis of the plural updated empirical strength component sequences and the plural empirical distance component sequences.

After removing all the burst noise elements in the detailed part set {D1_*i*, D2_*i*, ..., DN_i}, it is possible to utilize the updated result to conduct training so as to generate a multi-scale neural network model. In particular, by letting the updated {D1_*i*, D2_*i*, ..., DN_i, AN_i} serve as input values, and letting the {D1_*o*, D2_*o*, ..., DN_o, AN_o} serve as desired values, it is possible to obtain a three layered back propagation neural network model (i.e., a multi-scale neural network model), as described above.

In STEP S310 of FIG. 4, an original real-time strength sequence is obtained.

After obtaining the multi-scale neural network model, it is possible to, in the follow-on steps of FIG. 4, use the real-time RSSI signal sequence $Y_m$ and the obtained multi-scale neural network model to calculate an empirical distance.

As shown in FIG. 6, similar to STEP S304 of FIG. 4, in this step, the waiting-for-localization node 12 may obtain a real-time RSSI signal sequence $Y_m$=[y1, y2, . . . , yk, . . . , yK] to server as the original real-time strength sequence; here, K refers to the length of this sequence, and is related to the sampling frequencies.

In STEP S311, multi-scale transform is conducted with respect to the original real-time strength sequence so as to obtain plural real-time strength component sequences.

Here it is possible to utilize the N layered wavelet analysis related techniques to conduct decomposition and reconstruction with respect to real-time signals so as to obtain multi-scale signals, namely, N detailed part sequences and one approximation part sequence. Here it should be noted that since each sequence among the multi-scale signals is obtained on the basis of the real-time RSSI signal sequence $Y_m$, and because the real-time RSSI signal sequence $Y_m$ includes K elements in total, the corresponding sequence may also include K elements.

In STEP S312, regarding each of the plural real-time strength component sequences, it is determined whether there exists at least one burst noise element in the corresponding real-time strength component sequence.

Here it is possible to determine whether there exists at least one burst noise element in each of the plural real-time strength component sequences. In the former case, STEP S313 of FIG. 4 will be conducted so as to localize the burst noise element, and in the latter case, STEP S315 of FIG. 4 will be conducted.

In STEP S313 of FIG. 4, the burst noise element in each of the plural real-time strength component sequences is localized.

In STEP S314 of FIG. 4, the at least one burst noise element in each of the plural real-time strength component sequences is removed.

Here it should be noted that the process of STEPS S312 to S314 of FIG. 4 is similar to the process of STEPS S306 to S308 of FIG. 4. The difference between the two processes is that the processing object in the former process is the empirical RSSI signal sequence $X_m$, whereas the processing object in the latter process is the real-time RSSI signal sequence $Y_m$. As such, the repeated descriptions are omitted here.

In addition, for the sake of convenience, the noise removal process conducted with respect to only the detailed part sets in the real-time strength component sequences was taken as an instance for illustration, but, as described above, actually it is also possible to conduct noise removal with respect to the approximation part sets in the real-time strength component sequences.

In STEP S315 of FIG. 4, plural real-time distance component sequences are estimated on the basis of the plural updated real-time strength component sequences and the multi-scale empirical mapping relationship.

After removing all the burst noise elements in the multi-scale signals of the real-time RSSI signal sequence $Y_m$, it is possible to input the approximation part sequences and the updated detailed part sequences into the generated multi-scale neural network model so as to obtain an approximation distance sequence $D2_{m(N+1)}$ and detail distance sequence set $(D2_{m1}, D2_{m2}, \ldots, D2_{mN})$. Here the approximation distance sequence is a distance component related result obtained when the approximation part sequences in the multi-scale signals of the real-time RSSI signal sequence $Y_m$ serve as input values of the generated multi-scale neural network model; and the detail distance sequence set is distance component related results when the updated detailed part sequences in the multi-scale signals of the real-time RSSI signal sequence $Y_m$ server as input values of the generated multi-scale neural network model.

In STEP S316 of FIG. 4, an empirical real-time distance is generated on the basis of the plural real-time distance component sequences.

For example, it is possible to obtain the empirical real-time distance $D2_m$ according to the following equation (3).

$$D2_m = \Sigma_{i=1}^{K}(D2_{m1}(i)+D2_{m2}(i)+ \ldots +D2_{m(N+1)}(i))/K \quad (3)$$

Here, K denotes the number of RRSI signals included in the real-time RSSI signal sequence $Y_m=[y1, y2, \ldots, yk, \ldots, yK]$. For example, regarding the detail distance sequence set $(D2_{m1}, D2_{m2}, \ldots, D2_{mN})$, if the first sequence $D2_{m1}$ therein is taken as an instance, then $D2_{m1}(i)$ is an i-th element among the K elements included in the first sequence $D2_{m1}$. In addition, $D2_{m(N+1)}(i)$ is an i-th element among the K elements included in the approximation distance sequence $D2_{m(N+1)}$.

In STEP S317 of FIG. 4, an ideal real-time distance is estimated on the basis of the original real-time strength sequence and an ideal mapping relationship.

Aside from calculating the empirical real-time distance, it is also possible to estimate the ideal real-time distance on the basis of the original real-time strength sequence and the ideal mapping relationship.

For example, after the waiting-for-localization node 12 obtains the real-time RSSI signal sequence $Y_m=[y1, y2, \ldots, yk, \ldots, yK]$, it is possible to obtain an ideal real-time distance $D1_{mk}$ corresponding to yk therein according to the following equation (4).

$$D1_{m1} = 10^{-(yk+D_s)/10\epsilon} \quad (4)$$

Here, $D_s$ refers to the RSSI value when the distance between a waiting-for-localization node and a reference node is one meter; and E refers to a signal path loss factor, i.e., a propagation coefficient.

After that, it is possible to obtain the average value of a distance sequence $[D1_{n1}, D1_{m2}, \ldots, D1_{mK}]$ corresponding to the real-time RSSI signal sequence $Y_m=[y1, y2, \ldots, yk, \ldots, yK]$ according to the following equation (5), so as to obtain a final ideal real-time distance $D1_m$.

$$D1_m = \frac{1}{K}\sum_{i=1}^{K} D1_m(i) \quad (5)$$

In STEP S318 of FIG. 4, the degree of environmental change in the specific environment is determined on the basis of the empirical real-time distance and the ideal real-time distance.

Here it is possible to conduct mutual correction with respect to the empirical real-time distance and the ideal real-time distance.

For this purpose, after obtaining the empirical real-time distance $D2_m$ and the ideal real-time distance $D1_m$, it is possible to calculate the difference value GapD between the two distances according to the following equation (6), so as to serve as the degree of environmental change.

$$GapD = \frac{\min(D1_m, D2_m)}{\max(D1_m, D2_m)} \quad (6)$$

In STEP S319 of FIG. 4, it is determined whether the degree of environmental change is greater than or equal to a predetermined threshold of environmental change.

Here, by comparing GapD and a predetermined model update threshold $D_{th}$, it is possible to determine whether the degree of environmental change is greater than or equal to the predetermined threshold of environmental change.

If it is determined that the degree of environmental change is greater than or equal to the predetermined threshold of environmental change, i.e., $GapD \geq D_{th}$, then that means the circumstance in the indoor environment has changed. That is, the parameters of the multi-scale neural network model have become invalid, namely, it is necessary to update the parameters of the multi-scale neural network model. As such, STEP S304 of FIG. 4 will be conducted again so as to update the parameters of the multi-scale neural network model.

If it is determined that the degree of environmental change is less than the predetermined threshold of environmental change, i.e., $GapD<D_{th}$, then that means it is not necessary to update the parameters of the multi-scale neural network model. As such, STEP S320 of FIG. 4 will be conducted so as to calculate the final distance between the waiting-for-localization node 12 and the reference node 11.

In STEP S302 of FIG. 4, the real-time distance between the waiting-for-localization node and the reference node m is determined on the basis of the empirical real-time distance and the ideal real-time distance.

For example, it is possible to calculate the real-time distance between the waiting-for-localization node 12 and the reference node m (i.e., the reference node 11A) according to the following equation (7).

$$D_m = \alpha D1_m + (1-\alpha)D2_m$$

Here, $\alpha$ is a weight coefficient which may be obtained on the basis of the empirical real-time distance $D2_m$ and the ideal real-time distance $D1_m$ according to the following equation (8).

$$\alpha = \frac{D2_m}{D1_m + D2_m} \quad (8)$$

As a result, in this way, it is possible to calculate the final distance between the waiting-for-localization node 12 and the reference node 11A.

In STEP S321 of FIG. 4, it is determined whether there is a reference node whose distance to the waiting-for-localization node 12 has not been calculated.

Here it is possible to determine whether the final distances between the waiting-for-localization node 12 and all the reference nodes 11A to 11D have been calculated. In the former case, STEP S322 of FIG. 4 will be conducted, and in the latter case, STEP S301 of FIG. 4 will be conducted again.

In STEP S322 of FIG. 4, a selection factor corresponding to the reference node m is generated on the basis of the original real-time strength sequence and the degree of environmental change in the specific environment.

After the real-time distances between the waiting-for-localization node 12 and all the reference node 11A to 11D are calculated, it is possible to select some proper reference nodes so as to localize the waiting-for-localization node 12.

For this purpose, it is possible to set selection factors for selecting a predetermined number of reference nodes from the reference node 11A to 11D for localizing the waiting-for-localization node 12.

For example, by considering both the degree of environmental change in the indoor environment and the strengths of the original real-time RSSI signals, it is possible to calculate a selection factor $\omega_m$ corresponding to the reference m according to the following equation (9).

$$\omega_m = \beta(\Sigma_{i=1}^{K} Y_m(i))/K + (\beta-1)|D1_m - D2_m| \quad (9)$$

Here, $\beta$ is a weight coefficient obtained on the basis of simulation, and $0 \le \beta \le 1$; $Y_m(i)$ refers to an i-th element in the real-time RSSI signal sequence $Y_m = [y1, y2, \ldots, yk, \ldots, yK]$ obtained by the waiting-for-localization node 12.

As such, by taking account of both the received signal strengths and the degree of environment in the indoor environment when conducting reference node selection, it is possible to select some reference nodes whose communications with the waiting-for-localization node 12 may receive the influence of burst noise as little as possible.

In STEP S323 of FIG. 4, a predetermined number of reference nodes are selected on the basis of the values of the selection factors corresponding to the reference nodes.

Here it is possible to sort the reference nodes 11A to 11D in descending order on the basis of the values of the selection factors corresponding the reference nodes 11A to 11D so as to obtain a reference node ranking list, and then to select the top three reference nodes therein to serve as the predetermined number of reference nodes.

In STEP S324 of FIG. 4, the waiting-for-localization node is localized on the basis of the real-time distances between the waiting-for-localization node and the selected reference nodes as well as the positions of the selected reference nodes.

Finally it is possible to adopt a triangulation algorithm to localize the waiting-for-localization node 12 on the basis of the real-time distances between the waiting-for-localization node 12 and the three reference nodes selected from the reference nodes 11A to 11D.

Figure 8:
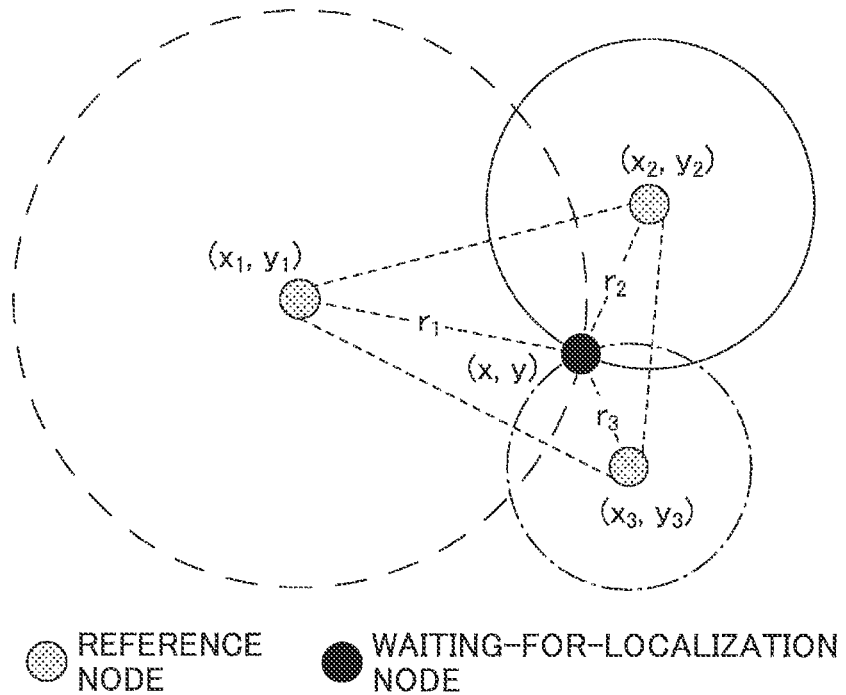
FIG. 8 illustrates the principle of a triangulation algorithm.

FIG. 8 illustrates the principle of the triangulation algorithm.

As shown in FIG. 8, in a case where the coordinates (x1, y1), (x2, y2), and (x3, y3) of the selected three reference nodes are known, and the distances r1, r2, and r3 between the waiting-for-localization node and the selected three reference nodes are also known, by drawing three circles, it is possible to determine the coordinates (x, y) of the waiting-for-localization node.

In particular, it is possible to determine the position (x, y) of the waiting-for-localization node 12 by utilizing the three equations shown in FIG. 8.

As a result, it can be seen for the above that by utilizing the node localization method according to this embodiment, it is possible to utilize the multi-scale signals obtained by conducting wavelet analysis to create a multi-scale self-adaptive neural network model so as to be able to utilize the real-time RSSI signal strengths to improve the timeliness of the finally obtained real-time distance. In addition, compared to the conventional localization methods on the basis of only an ideal path loss model, the node localization method also takes account of the empirical RSSI signal strengths so as to be able to dramatically improve its availability.

Up to here, the node localization method according to this embodiment has been concretely illustrated according to STEPS S301 to S324 of FIG. 4. To sum up, the node localization method may mainly include the following four steps, namely, empirical real-time distance estimation, theoretical real-time distance estimation, final real-time distance estimation, and node localization. In particular, the empirical real-time distance estimation step mainly includes STEPS S303 to S316 of FIG. 4. The theoretical real-time distance estimation step mainly includes STEPS S310 to S317. The final real-time distance estimation step mainly includes S318 to S320 of FIG. 4. And the node localization step mainly includes STEPS S321 to S324 of FIG. 4.

Here it should be noted that although the node localization method according to this embodiment has been concretely illustrated in the specific order from STEP S301 to STEP 324, the present invention is not limited to this. For example, the empirical real-time distance estimation step may be conducted after the theoretical real-time distance estimation step, or the two steps may also be conducted at the same time (i.e., in parallel). That is, STEP S317 of FIG. 4 may be implemented before STEP S311 of FIG. 4, or may also be implemented together with one or more steps of STEPS S311 to 5361 of FIG. 4 at the same time. In addition, one or more steps of STEPS S301 to S324 of FIG. 4 (e.g., STEP S319; or STEPS S321 and S322) may also be omitted so as to be able to improve the node localization speed.

6. Distance Estimation Device

According to an embodiment of the present invention, it is also possible to provide a distance estimation device which is used for estimating the real-time distance between first and second nodes in a specific environment. The first node may receive signals sent from the second node. For example, the distance estimation device may be applied in the first node, the second node, or any other proper electronic device.

Figure 9:
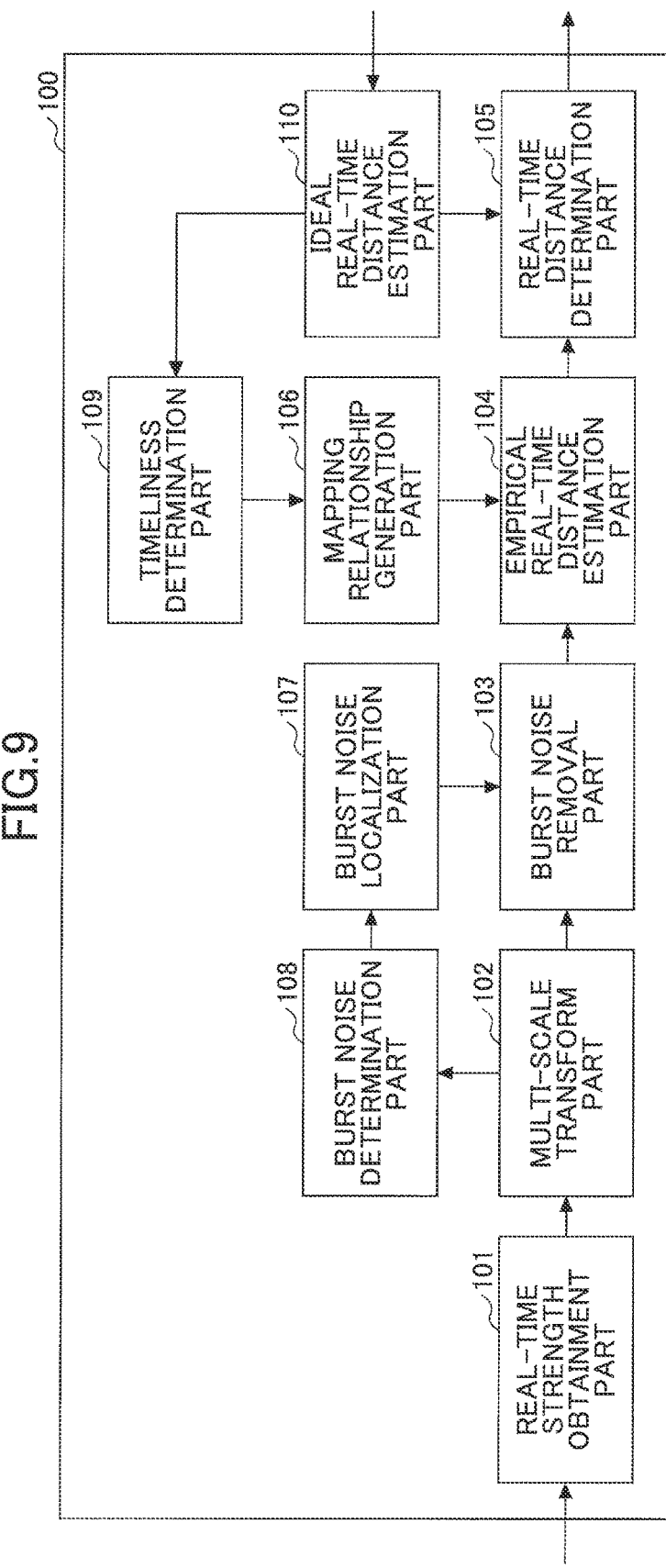
FIG. 9 is a functional block diagram of a distance estimation device according to an embodiment of the present invention.

In what follows, the distance estimation device will be illustrated in detail by referring to FIG. 9.

FIG. 9 is a functional block diagram of a distance estimation device 100 according to the embodiment of the present invention.

As shown in FIG. 9, the distance estimation device 100 may include a real-time strength obtainment part 101, a multi-scale transform part 102, a burst noise removal part 103, an empirical real-time distance estimation part 104, and a real-time distance determination part 105.

The real-time strength obtainment part 101 is configured to be able to obtain an original real-time strength sequence in which each value is the strength of a signal received by the first node from the second node at the corresponding time slot of a first time period.

The multi-scale transform part 102 is configured to be able to conduct multi-scale transform with respect to the original real-time strength sequence so as to acquire plural real-time strength component sequences which are the results of the original real-time strength sequence projected onto plural scales, respectively.

The burst noise removal part 103 is configured to be able to remove at least one burst noise element in the each real-time strength component sequence.

The empirical real-time distance estimation part 104 is configured to be able to estimate, on the basis of the plural real-time strength component sequences after burst noise removal as well as a multi-scale empirical mapping relationship, an empirical real-time distance. The multi-scale empirical mapping relationship is used for express the correspondence relations between strength components and distance components on the plural scales.

The real-time distance determination part 105 is configured to be able to determine, on the basis of at least the empirical real-time distance, the real-time distance between the first and second nodes.

In an example, the distance estimation device 100 may further include a mapping relationship generation part 106 configured to be able to obtain an original empirical strength sequence and its corresponding original empirical distance sequence, wherein, each value of the original empirical strength sequence is the strength of a signal received by the first node from the second node at a corresponding time slot of a second time period prior to the first time period, and each value of the corresponding original empirical distance sequence is the distance between the first and second nodes obtained at the corresponding time slot of the second time period; conduct multi-scale transform with respect to the original empirical strength sequence and its corresponding original empirical distance sequence so as to obtain plural empirical strength component sequences and plural empirical distance component sequences, wherein, the plural original empirical strength component sequences are the results of the original empirical strength sequence projected onto the plural scales, and the plural empirical distance component sequences are the results of the corresponding original empirical distance sequence projected onto the plural scales; remove at least one burst noise element in each empirical strength component sequence; and generate, on the basis of the plural empirical strength component sequences after burst noise removal as well as the plural empirical distance component sequences, a multi-scale empirical mapping relationship.

In an example, the distance estimation device 100 may further include a burst noise removal part 107 configured to be able to, regarding each real-time strength component sequence before removing the at least one burst noise element in the corresponding real-time strength component sequence, calculate the average value of the respective elements in the corresponding real-time strength component sequence; regarding each element of the corresponding real-time strength component sequence, calculate the difference value between the average value and the corresponding element; and if the difference value is greater than or equal to a predetermined threshold, then to determine that the corresponding element is a burst noise element.

In an example, the distance estimation device 100 may further include a burst noise element determination part 108 configured to be able to, before calculating the average value of the respective elements of each real-time strength component sequence, calculate the total deviation of the corresponding real-time strength component sequence; and if the total deviation is greater than or equal to a predetermined threshold, then calculate the average value of the respective elements of the corresponding real-time strength component sequence.

In an example, the burst noise removal part 103 may adopt the following steps to remove the at least one burst noise element in each real-time strength component sequence, namely, regarding each real-time strength component sequence, calculating the average value of the non-bursts noise elements in the corresponding real-time strength component sequence; and utilizing the average value to replace the at least one burst noise element in the corresponding real-time strength component sequence.

In an example, the empirical real-time distance estimation part 104 may adopt the following steps to estimate the empirical real-time distance on the basis of the plural real-time strength component sequences after burst noise removal and the multi-scale empirical mapping relationship, namely, estimating plural real-time distance component sequences on the basis of the plural real-time strength component sequences and the multi-scale empirical mapping relationship, wherein, the plural real-time distance component sequences are the results of the original real-time distance sequence projected onto the plural scales, and each element of the original real-time distance sequence is the distance between the first and second nodes estimated at the corresponding time slot of the first time period; and generating the empirical real-time distance on the basis of the plural real-time distance component sequences.

In an example, the distance estimation device 100 may further include a timeliness determination part 109 configured to be able to, before determining the real-time distance between the first and second nodes on the basis of at least one empirical real-time distance, determine, based on the empirical real-time distance and an ideal real-time distance, the degree of environmental change in the specific environment, wherein, the ideal real-time distance is the distance between the first and second nodes estimated in an ideal circumstance on the basis of the original real-time strength sequence; if the degree of environmental change is less than a predetermined threshold of environmental change, then determine that the multi-scale empirical mapping relationship meets the demand of timeliness, so as to inform the real-time distance determination part 105 to determine the real-time distance between the first and second nodes on the basis of at least the empirical real-time distance; and if the degree of environmental change is greater than or equal to the predetermined threshold of environmental change, then determine that the multi-scale empirical mapping relationship does not satisfy the demand of timeliness, so as to inform the mapping relationship generation part 106 to obtain a new original empirical strength sequence and its new corresponding original empirical distance sequence, and to generate a new multi-scale empirical mapping relationship.

In an example, the real-time distance determination part 105 may adopt the following step to determine the real-time distance between the first and second nodes on the basis of at least the empirical real-time distance, namely, determining the real-time distance between the first and second nodes on the basis of the empirical real-time distance and an ideal real-time distance. The ideal real-time distance is the node distance between the first and second nodes estimated in an ideal circumstance on the basis of the original real-time strength sequence.

In an example, the distance estimation unit 100 may further include an ideal real-time distance estimation part 110 configured to be able to estimate, on the basis the original real-time strength sequence and an ideal mapping relationship, the ideal real-time distance. The ideal mapping relationship is used to express the correspondence relations between signal strengths and node distances in an ideal circumstance.

Here it should be noted that the functions of the real-time strength obtainment part 101, the multi-scale transform part 102, the burst noise removal part 103, the empirical real-time distance estimation part 104, the real-time distance determination part 105, the mapping relationship generation part 106, the burst noise removal part 107, the burst noise determination part 108, the timeliness determination part 109, and the ideal real-time distance determination part 110 have been concretely described by referring to FIGS. 1 to 8, so the repeated descriptions are omitted here.

As a result, it can be seen from the above that by utilizing the distance estimation device according to the embodiment of the present invention, it is possible to, when estimating the distance between two nodes on the basis of the relevant received signal strength(s), carry out multi-scale transform with respect to the received signal strength(s) so as to project the received signal strength(s) onto plural scales, so that it is possible to accurately localize and remove the component(s) of burst noise projected onto the plural scales. Aside from this, by utilizing the distance estimation device, it is also possible to take account of the time varying characteristic of the received signal sequence(s), so that in the relevant distance measurement process, it is possible to utilize weight coefficients to carry out mutual correction with respect to an ideal real-time distance having timeliness and an empirical real-time distance having historical orderliness so as to get a final real-time distance. As a result, by utilizing the distance estimation method device according to this embodiment, it is possible to improve the precision of the relevant distance estimation result.

7. Node Localization Apparatus

In addition, a node localization apparatus according to an embodiment of the present invention is provided which is used to localize, on the basis of a node distance measured by a distance estimation device (e.g., the distance estimation device according to the above embodiment), a waiting-for-localization node whose position is unknown in a specific environment. The waiting-for-localization node is able to communicate with plural reference nodes whose positions are known. For example, the node localization apparatus may applied in the waiting-for-localization node, any one of the plural reference nodes, or any other proper electronic device.

Figure 10:
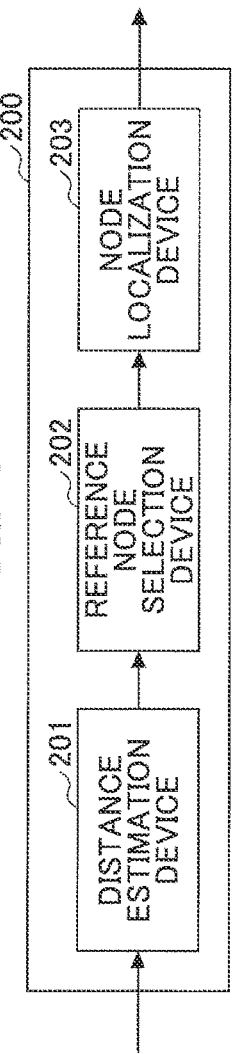
FIG. 10 is a functional block diagram of a node localization apparatus according to an embodiment of the present invention.

In what follows, the functional structure of the node localization apparatus according to this embodiment will be concretely illustrated by referring to FIG. 10.

FIG. 10 is a functional block diagram of a node localization apparatus 200 according to the embodiment of the present invention.

As shown in FIG. 10, the node localization apparatus 200 may include a distance estimation device 201, a reference node selection device 202, and a node localization device 203.

The distance estimation device 201 is configured to be able to estimate the real-time distances between a waiting-for-localization node and plural reference nodes, respectively.

The reference node selection device 202 is configured to be able to select a predetermined number of reference nodes from the plural reference nodes.

The node localization device 203 is configured to be able to localize the waiting-for-localization node on the basis of the real-time distances between the waiting-for-localization node and the plural reference nodes as well as the positions of the plural reference nodes.

In an example, the distance estimation device 201 may be achieved by utilizing the configuration of the distance estimation device 100 shown in FIG. 9. Alternatively, the distance estimation device 100 may be achieved by utilizing any proper conventional distance estimation device.

Here it should be noted that the functions of the distance estimation device 201, the reference node selection device 2023, and the node localization node 203 have been concretely described by referring to FIGS. 1 to 8, so the repeated descriptions are omitted here.

As a result, it can be seen for the above that by utilizing the node localization apparatus according to this embodiment, it is possible to, when localizing a waiting-for-localization node on the basis of the real-time distances between the waiting-for-localization node and the relevant reference nodes, select some proper reference nodes according to a comprehensive criterion so as to be able to ensure that the estimated distance between the waiting-for-localization node and each selected reference node may receive the influence of burst noise as little as possible, so that the node localization method may well adapt to different complicated environments, and may effectively improve its localization accuracy.

Here it should be noted that as described above, although the parts and/or devices respectively serve as the subjects of the steps, the present invention is not limited to this. That is, all the subjects of the steps may also be replaced by one or more apparatuses, devices, units, or even modules.

For example, the steps, which are implemented by the real-time strength obtainment part 101, the multi-scale transform part 102, the burst noise removal part 103, the empirical real-time distance estimation part 104, the real-time distance determination part 105, the mapping relationship generation part 106, the burst noise localization unit 107, the burst noise determination part 108, the timeliness determination part 109, the ideal real-time distance determination part 110, and/or the distance estimation device 201, the reference node selection device 202, and the node localization device 203 serving as the subjects, may be achieved in a unified manner by a processor (e.g., a central processing unit (CPU)) of an electronic apparatus.

Additionally it should be noted that the above respective embodiments are just exemplary ones, and the specific structure and operation of each of them may not be used for limiting the present invention.

Moreover, the embodiments of the present invention may be implemented in any convenient form, for example, using dedicated hardware or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing part (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201410636734.9 filed on Nov. 6, 2014, the entire contents of which are hereby incorporated by reference.

What is claimed is:

1. A method of estimating a distance between first and second nodes in a specific environment, the first node being able to receive a signal from the second node, the method comprising:
    an obtainment step of obtaining an original real-time strength sequence, elements of the original real-time strength sequence being strengths of signals received by the first node from the second node at respective time slots of a first time period;
    a transformation step of conducting multi-scale transform with respect to the original real-time strength sequence so as to acquire plural real-time strength component sequences which are results of the original real-time strength sequence projected onto plural scales, respectively;
    a removal step of removing at least one burst noise element in each of the plural real-time strength component sequences so as to get plural updated real-time strength component sequences;
    an estimation step of estimating, based on the plural updated real-time strength component sequences and a multi-scale empirical mapping relationship, an empirical real-time distance, the multi-scale empirical mapping relationship being used for expressing correspondence relations between strength components and distance components on each of the plural scales; and
    a determination step of determining, based on at least the empirical real-time distance, a real-time distance between the first and second nodes.

2. The method according to claim 1, further comprising:
    a second obtainment step of obtaining an original empirical strength sequence and an original empirical distance sequence corresponding to the original empirical strength sequence, elements of the original empirical strength sequence being strengths of signals received by the first node from the second node at respective time slots of a second time period prior to the first time period, elements of the original empirical distance sequence being distances between the first and second nodes obtained at the respective time slots of the second time period;
    a second transformation step of respectively conducting multi-scale transform with respect to the original empirical strength sequence and the original empirical distance sequence so as to acquire plural empirical strength component sequences and plural empirical distance component sequences, the plural empirical strength component sequences being results of the original empirical strength sequence projected onto the plural scales, the plural empirical distance component sequences being results of the original empirical distance sequence projected onto the plural scales;
    a second removal step of removing at least one burst noise element in each of the plural empirical strength component sequences so at to obtain plural updated empirical strength component sequences; and
    a generation step of generating, based on the plural updated empirical strength component sequences and the plural empirical distance component sequences, the multi-scale mapping relationship.

3. A method according to claim 1, further comprising:
    before the removal step, regarding each of the plural real-time strength component sequences,
    calculating an average value of respective elements in the corresponding real-time strength component sequence; and
    for each element of the corresponding real-time strength component sequence, calculating an individual difference between the average value and a value of the corresponding element, and if the individual difference is greater than or equal to a predetermined individual difference threshold, then determining that the corresponding element is a burst noise element.

4. The method according to claim 3, further comprising:
    before calculating the average value of the respective elements in the corresponding real-time strength component sequence,
    calculating a total deviation value of the corresponding real-time strength component sequence; and
    if the total deviation value is greater than or equal to a predetermined total deviation threshold, then calculating the average value of the respective elements in the corresponding real-time strength component sequence.

5. The method according to claim 1, wherein, the removal step includes:
    regarding each of the plural real-time strength component sequences,
    calculating an average value of elements different from the at least one burst noise element in the corresponding real-time strength component sequence; and
    replacing a value of the at least one burst noise element by the average value.

6. The method according to claim 1, wherein, the estimation step includes:
    estimating, based on the plural updated real-time strength component sequences and the multi-scale empirical mapping relationship, plural real-time distance component sequences which are results of an original real-time distance sequence respectively projected onto the plural scales, elements of the original real-time distance sequence being distances between the first and second nodes estimated at the respective time slots of the first time period; and
    generating the empirical real-time distance based on the plural real-time distance component sequences.

7. The method according to claim 1, further comprising:
    before the determination step,
    determining, based on the empirical real-time distance and an ideal real-time distance, a degree of environmental change in the specific environment, the ideal real-time distance being a node distance between the first and second nodes estimated based on the original real-time strength sequence in an ideal circumstance;
    if the degree of environmental change is less than a predetermined threshold of environmental change, then determining the real-time distance between the first and second nodes based on at least the empirical real-time distance; and
    if the degree of environmental change is greater than or equal to the predetermined threshold of environmental change, then obtaining a new original empirical strength sequence and a new original empirical distance sequence corresponding to the new original empirical strength sequence so as to generate a new multi-scale empirical mapping relationship.

8. The method according to claim 1, wherein, the determination step includes:
   determining, based on the empirical real-time distance and an ideal real-time distance, the real-time distance between the first and second nodes, the ideal real-time distance being a node distance between the first and second nodes estimated based on the original real-time strength sequence in an ideal circumstance.

9. The method according to claim 7, further comprising:
   estimating, based on the original real-time strength sequence and an ideal mapping relationship, the ideal real-time distance, the ideal mapping relationship being used to express correspondence relations between signal strengths and node distance in the ideal circumstance.

10. A method of localizing at least one waiting-for-localization node whose position is unknown, the at least one waiting-for-localization node being able to communicate with plural reference nodes whose positions are known, the method comprising:
   an estimation step of estimating, by adopting the method according to claim 1, real distances between the at least one waiting-for-localization node and the plural reference nodes, respectively;
   a selection step of selecting a predetermined number of reference nodes from the plural reference nodes; and
   a localization step of localizing, based on the real distances between the at least one waiting-for-localization node and the predetermined number of reference nodes as well as the positions of the predetermined number of reference nodes, the at least one waiting-for-localization node.

11. The method according to claim 10, wherein, the selection step includes:
   generating, based on the original real-time strength sequence and a degree of environmental change in the specific environment, plural selection factors corresponding to the plural reference nodes; and
   selecting the predetermined number of reference nodes from the plural reference nodes in descending order based on values of the plural selection factors.

12. A device for estimating a distance between first and second nodes in a specific environment, the first node being able to receive a signal from the second node, and the device comprising:
   an obtainment part configured to obtain an original real-time strength sequence, elements of the original real-time strength sequence being strengths of signals received by the first node from the second node at respective time slots of a first time period;
   a transformation part configured to conduct multi-scale transform with respect to the original real-time strength sequence so as to acquire plural real-time strength component sequences which are results of the original real-time strength sequence projected onto plural scales, respectively;
   a removal part configured to remove at least one burst noise element in each of the plural real-time strength component sequences so as to get plural updated real-time strength component sequences;
   an estimation part configured to estimate, based on the plural updated real-time strength component sequences and a multi-scale empirical mapping relationship, an empirical real-time distance, the multi-scale empirical mapping relationship being used for expressing correspondence relations between strength components and distance components on each of the plural scales; and
   a determination part configured to determine, based on at least the empirical real-time distance, a real-time distance between the first and second nodes.

13. An apparatus for localizing at least one waiting-for-localization node whose position is unknown, the at least one waiting-for-localization node being able to communicate with plural reference nodes whose positions are known, the apparatus comprising:
   the device according to claim 12, configured to estimate real distances between the at least one waiting-for-localization node and the plural reference nodes, respectively;
   a selection device configured to select a predetermined number of reference nodes from the plural reference nodes; and
   a localization device configured to localize, based on the real distances between the at least one waiting-for-localization node and the predetermined number of reference nodes as well as the positions of the predetermined number of reference nodes, the at least one waiting-for-localization node.

* * * * *